(12) United States Patent
Vellekoop et al.

(10) Patent No.: US 12,345,864 B2
(45) Date of Patent: Jul. 1, 2025

(54) APPARATUS AND METHOD FOR MANIPULATING A FOCUS OF EXCITATION LIGHT ON OR IN A SAMPLE AND MICROSCOPE

(71) Applicant: Carl Zeiss Microscopy GmbH, Jena (DE)

(72) Inventors: Ivo Vellekoop, Enschede (NL); Tzu-Lun Wang, Duisburg (DE); Bahareh Mastiani, Hengelo (NL); Kai Wicker, Jena (DE); Christoph Husemann, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 966 days.

(21) Appl. No.: 17/427,303

(22) PCT Filed: Jan. 31, 2019

(86) PCT No.: PCT/EP2019/052350
§ 371 (c)(1),
(2) Date: Jul. 30, 2021

(87) PCT Pub. No.: WO2020/156671
PCT Pub. Date: Aug. 6, 2020

(65) Prior Publication Data
US 2022/0155575 A1 May 19, 2022

(51) Int. Cl.
*G02B 21/00* (2006.01)
(52) U.S. Cl.
CPC ..... *G02B 21/0032* (2013.01); *G02B 21/0048* (2013.01); *G02B 21/0076* (2013.01)

(58) Field of Classification Search
None
See application file for complete search history.

(56) References Cited

U.S. PATENT DOCUMENTS

| 5,659,420 A * | 8/1997 | Wakai | G01B 11/026 359/371 |
| 2002/0031158 A1* | 3/2002 | Kleinschmidt | H01S 3/1392 372/55 |

(Continued)

FOREIGN PATENT DOCUMENTS

| DE | 11 2015 002 953 T5 | 3/2017 |
| WO | 2016/141339 A1 | 9/2016 |

OTHER PUBLICATIONS

International Search Report for PCT/EP2019/052350 dated Nov. 4, 2019.

(Continued)

*Primary Examiner* — Jyotsna V Dabbi
(74) *Attorney, Agent, or Firm* — DUANE MORRIS LLP

(57) ABSTRACT

An apparatus and method for manipulating a focus of excitation light on or in a sample, particularly in a microscope. The apparatus has a light source for emitting excitation light, an excitation beam path for guiding the excitation light onto or into the sample, the excitation beam path comprising an objective for guiding the excitation light onto or into the sample and a wavefront modulator for modulating the excitation light, and a control device for driving the wavefront modulator. The control device is designed for driving the wavefront modulator to generate a number of (Continued)

shaped waves on or in the sample. A focus is generated at a specified location on or in the sample by superposition of the shaped waves.

26 Claims, 13 Drawing Sheets

(56) References Cited

U.S. PATENT DOCUMENTS

| | | | |
|---|---|---|---|
| 2003/0016901 A1* | 1/2003 | Cormack | G01J 3/453 |
| | | | 356/477 |
| 2003/0107981 A1* | 6/2003 | Hendriks | G11B 7/13925 |
| | | | 369/112.26 |
| 2009/0084980 A1 | 4/2009 | Mertz | |
| 2010/0231999 A1* | 9/2010 | Kroll | G02B 26/005 |
| | | | 359/290 |
| 2011/0006231 A1* | 1/2011 | Betzig | G01J 9/00 |
| | | | 359/383 |
| 2015/0362713 A1* | 12/2015 | Betzig | G02B 21/006 |
| | | | 250/459.1 |
| 2016/0003740 A1* | 1/2016 | Tao | G01N 21/6428 |
| | | | 250/201.3 |
| 2017/0123300 A1* | 5/2017 | Shishido | G03B 21/208 |

OTHER PUBLICATIONS

Mertz, Jerome, et al.; "Field of view advantage of conjugate adaptive optics in microscopy applications"; ARXIV.org; Cornell University Library, Jan. 12, 2015; 1-11.
Pozzi, Paolo, et al.; "Anisoplanatic adaptive optics in parallelized laser scanning microscopy"; ARXIV.org; Cornell University Library, Sep. 20, 2018; 1-11.
https://en.wikipedia.org/wiki/Phased_array_ultrasonics; 1-4.
Vellekoop, I. M. et al.; "Focusing coherent light through opaque strongly scattering media"; Optics Letters 2007; 32(16):2309-2311.
Wang, K. et al. ; "Direct wavefront sensing for high-resolution in vivo imaging in scattering tissue"; Nature Communications 2015; 6,7276:1-6.
Tang, J., et al.; "Superpenetration optical microscopy by iterative multiphoton adaptive compensation technique", Proc. Natl. Acad. Sci. 2012; 109(22):8434-8439.
Transmittal of International Preliminary Report on Patentability, International Preliminary Report on Patentabilty for PCT/EP2019/052350 dated Jul. 27, 2021 and Written Opinion of the International Searching Authority.

\* cited by examiner

APPARATUS AND METHOD FOR MANIPULATING A FOCUS OF EXCITATION LIGHT ON OR IN A SAMPLE AND MICROSCOPE

RELATED APPLICATIONS

The present application is a U.S. National Stage application of International PCT Application No. PCT/EP2019/052350 filed on Jan. 31, 2019, the contents of which are incorporated by reference in their entirety.

FIELD OF THE INVENTION

The present invention is concerned with an apparatus and a method for manipulating a focus of excitation light on or in a sample, particularly in a microscope. In a further aspect, the invention is concerned with a microscope, particularly a nonlinear microscope.

BACKGROUND OF THE INVENTION

A generic apparatus for manipulating a focus of excitation light on or in a sample, particularly in a microscope, comprises the following components: a light source for emitting excitation light, an excitation beam path for guiding the excitation light onto our into the sample, the excitation beam path comprising an objective for guiding the excitation light onto or into the sample and a wavefront modulator for modulating the excitation light, and a control device for driving the wavefront modulator.

A generic method for manipulating a focus of excitation light on or in a sample, particularly in microscope, comprises the following steps: guiding the excitation light on an excitation beam path to an objective, guiding, by means of the objective, the excitation light onto or into the sample, manipulating, by means of a wavefront modulator in the excitation beam path, the excitation light.

Such apparatuses and methods are, e.g., known from: Vellekoop, I. M. & Mosk, A. P.: "Focusing coherent light through opaque strongly scattering media", Opt. Lett. 32, 2309-2311 (2007); Wang, K. et al. "Direct wavefront sensing for high-resolution in vivo imaging in scattering tissue", Nat. Commun. 6, 7276 (2015); and Tang, J., Germain, R. N. & Cui, M. "Superpenetration optical microscopy by iterative multiphoton adaptive compensation technique", Proc. Natl. Acad. Sci. 109, 8434-8439 (2012).

Scattering and tissue-induced aberrations are the main limitations for imaging deep inside biological tissues.

In this context, technologies of complex wavefront shaping involving adaptive optics like wavefront modulators are known to compensate for scattering and aberrations.

SUMMARY OF THE INVENTION

One essential problem is that a correction is only valid for a finite region in the scattering medium, i.e. the sample, known as the isoplanatic patch. This situation is explained with reference to FIG. 1 where, schematically, parts of an excitation beam path 20 of a prior art laser scanning microscope are shown. In principle, a beam of excitation light 12 is guided on an excitation beam path 20 with an optical axis 28 via a lens 22, an intermediate image plane 24, and a tube lens 26 to a microscope objective 21 and is focused with the microscope objective 21 to a focus at different locations 13, 14, 15 on or, generally, in a sample 10 (FIGS. 1a, 1b, 1c).

The sample 10 as such constitutes a scattering medium. At different angles of incidence, e.g. in FIGS. 1a, 1b, 1c, the beam of excitation light 12 propagates through different parts or regions of the sample 10, e.g. on different paths through the scattering medium.

The influences of scattering and aberrations to which the excitation light 12 is subjected on each of the different paths can, in principle, be corrected for individually by way of wavefront shaping and, more specifically in FIGS. 1a, 1b, and 1c, by means of a wavefront modulator 40. The wavefront modulator 40 is positioned near a pupil plane 25, i.e. in the proximity of a plane optically conjugate to a back focal plane 23 of the microscope objective 21. For driving or controlling the wavefront modulator 40 a control device is present which is not shown in FIG. 1.

A pupil plane is, though not strictly, but in many cases a plane that is optically conjugate to a back focal plane of the microscope objective. Since, in most cases, the back focal plane of a microscope objective is not a plane in a mathematical sense, the pupil plane also is not exactly a plane. When we talk in this description about a component being located in or near a pupil plane, we mean that at least situations are covered where the pupil plane runs through or is tangential to the respective component, e.g. the wavefront modulator.

However, due to the different paths to the locations 13, 14, and 15 of the focus, if an optimal focusing is to be achieved, in principle a different wavefront shaping or a different correction will be needed for each different location 13, 14, 15 of the focus. In other words, one and the same wavefront shaping will be valid, i.e. achieve an optimal focusing, only in a comparatively small region around one specific location. This comparatively small region is called the isoplanatic patch.

In order to achieve a field of view that is larger than the isoplanatic patch it is necessary, with conventional techniques, to use different corrections for each different region within the field of view. In FIG. 1, this is represented schematically by the wavefront modulator 40 having, in each case, a specific pattern representing the specific wavefront modulation in each of FIGS. 1a, 1b, 1c.

Since, therefore, a driving pattern for the wavefront modulator 40 needs to be updated for each specific isoplanatic patch and since the switching between different corrections is generally slow, the switching between different isoplanatic patches is generally also slow.

Also, for each isoplanatic patch, at least in the forward scattering regime, a different correction needs to be obtained, which requires multiple measurements. Typically, more measurements are needed when correcting for thicker aberrating layers, or when a high-quality focus is desired.

These factors together may result in an intolerable long processing time to acquire a corrected image with a large field of view.

One objective of the invention is to provide an apparatus and a method for manipulating a focus of excitation light in a sample as well as a microscope where large fields of view and short acquisition times are possible even for image planes inside a sample.

The terms manipulating and manipulation, for the purposes of this description shall cover both the creation of a focus and changing the location, i.e. moving, of a focus, like e.g. scanning of a focus.

The invention solves this objective by the apparatus with the features defined in the annexed apparatus claims, and by the method with the method steps defined in the annexed method claims.

Preferred embodiments of the inventive apparatus as well as advantageous variants of the method and the microscope according to the invention will be described in the following, in particular in connection with the dependent claims and the figures.

The generic apparatus as described above is, according to the invention, developed further in that the control device is designed for driving the wavefront modulator to generate a number of shaped waves on or in the sample, that a focus is generated at a specified location on or in the sample by superposition of the shaped waves and that, for manipulating the location of the focus on or in the sample, a device for imposing variably stepped phase shifts upon the shaped waves is present, where the phase shifts imposed in each case on the shaped waves change stepwise between different shaped waves.

The generic method as described above is, according to the invention, developed further in that the wavefront modulator is driven to generate a number of shaped waves on or in the sample, that stepped phase shifts are imposed upon the shaped waves, the phase shifts changing stepwise between different shaped waves, and that, for manipulating the location of the focus on or in the sample, the magnitude of the steps of the phase shifts between different shaped waves is varied.

The microscope according to the invention comprises an apparatus for focusing excitation light onto or into a sample according to the invention, where the objective is a microscope objective, a detection beam path for guiding detection light, in particular fluorescence light, in the direction of a detector, the detector for detecting the detection light, and a control unit for controlling the apparatus for focusing excitation light and the detector and for evaluating the detection data received from the detector.

One key idea of the invention is to generate a focus which can also be termed a focal volume by the superposition of a finite number of shaped waves with different propagating directions in the image plane. By means of the wavefront modulator each of the shaped waves can be individually modulated such that scattering processes in the sample are corrected for. This correction is preferably carried out such that, when the shaped waves after being propagated through the scattering volume of the sample arrive at the image plane, they resemble, in each case, plane waves.

The focus as such is generated by the superposition, i.e. by interference, of all the shaped waves in a focal plane in the sample. A focus generated this way will be referred to as interference focus.

The location of the focus can therefore be changed by changing the interference of the shaped waves which change, according to the invention, is brought about by varying the phase of each of the shaped waves and, more specifically, by imposing variably stepped phase shifts upon the shaped waves. In other words, the location of the focus on or in the sample is manipulated by varying the magnitude of the steps of the phase shifts between different shaped waves.

Ideally, according to the laws of Fourier-optics, an ideal plane wave in an image plane corresponds to a point in a Fourier plane. If one were to arrange the wavefront modulator in the pupil plane the compensation for a specific plane wave would be brought about by the points of the wavefront modulator in a region around a center which corresponds to the ideal plane wave. It has to be noted, though, that a setup with the wavefront modulator in a pupil plane, while possible, is not a preferred embodiment, see below.

A wavefront modulator is a device with many elements, e.g. pixels, actuators. These elements can be manipulated independently to modulate an incoming wavefront segmentally. The resulting conformation of manipulated elements, i.e. a certain pattern on the wavefront modulator, is referred to as a correction for scattering.

The wavefront modulator can include e.g. deformable mirrors, liquid crystal spatial light modulators (SLM), digital micromirror devices, piston-mirror spatial light modulators or any other programmable device, optically transmissive or reflective, that spatially modulates the phase, polarization, and/or amplitude of a light wave.

The apparatus and the method according to the invention therefore differ from prior-art solutions in both the way to form and to scan the focus.

When we talk about shaped waves in this description, we both want to address the wave packet in a focal plane of the sample as well as the corresponding distribution of the electromagnetic field at the location of the wavefront modulator. With the term "corresponding distribution", we mean the distribution of the electromagnetic field which, by the wavefront modulator, is subjected to phase and/or amplitude modulation which results, after being propagated through the excitation beam path approximately in a plane wave in the focal plane of the sample.

The distribution of electromagnetic intensity in a region around a center that corresponds ideally to a plane wave and which is subjected to phase and/or amplitude modulation by the wavefront modulator or the corrections applied by the wavefront modulator are, in the following, also simply referred to as a correction pattern.

It is a very important advantage of the invention, that the correction pattern as such for each of the shaped waves does not need to be changed when the focus is scanned through or across the sample. Except for the overall phase shift imposed on each of the correction patterns on the wavefront modulator, all correction patterns remain identical. Therefore, the correction patterns are still valid over the full field of view without the limitations in the prior art of the isoplanatic patch.

For moving the focus, it is only necessary to impose, as described above, varying uniform phases on each correction pattern, i.e. on each shaped wave. The location of the focus is manipulated by varying the differences of the imposed phases among correction patterns, i.e. among shaped waves. The phase differences between the individual shaped waves determine the position of the interference focus.

In principle, with the apparatus and the method according to the invention, the location of the focus can be manipulated, i.e. moved, in three dimensions.

A further important advantage of the present invention as compared to conventional adaptive optical methods of correcting scattering for large fields of view which require numerous corrections for different isoplanatic patches, is that far fewer corrections are needed for the same number of isoplanatic patches.

In the prior art, for correcting scattering in deeper or stronger scattering media, conventional adaptive optical methods require more corrections for the same size of the field of view. In this regard, the invention also achieves significant advantages since the number of the correction remains constant and does not increase with increasing imaging depth or scattering strength.

The apparatus and the method according to the invention can, in principle, be applied advantageously for any kind of optical apparatus, in particular any kind of microscope, where a well-defined focus within a sample is important.

Due to the nonlinear dependence of the excitation process on the excitation intensity achieved in the focus and the strong dependence of the fluorescence yield caused thereby, the present invention has particular advantageous applications in the nonlinear microscopy techniques.

The apparatus and the method according to the invention allow a manipulation of the location of the focus on or in the sample only by varying the magnitude of the steps of the phase shifts between different shaped waves.

Preferred embodiments of the inventive apparatus and advantageous variants of the method according to the invention are characterized in that each of the shaped waves is corrected for influences of the sample such that the shaped waves resemble planar wavefronts in a focal plane on or in the sample.

In principle, the wavefront modulator and the device for imposing variably stepped phase shifts, i.e. the step scanner, can be arranged anywhere in the excitation beam path upstream of the microscope objective. Also, the wavefront modulator can, in principle, be arranged either upstream or downstream from the device for imposing variably stepped phase shifts.

In a preferred embodiment of the invention, the device for imposing variably stepped phase shifts upon the shaped waves or at least a component of this device is arranged in a plane which is optically conjugate to a plane where the wavefront modulator is arranged.

In a further preferred embodiment, a lenslet array is present which is in particular arranged in a plane that is optically conjugate to a plane where the wavefront modulator is arranged and/or to a plane where the device for imposing variably stepped phase shifts are at least a component of this device is arranged.

Although it is, in principle, possible to put the step scanner behind, i.e. downstream of the wavefront modulator, this is often not the preferred embodiment because downstream of the wavefront modulator the light is shaped and contains high frequency components, it is impossible to focus it using. e.g. a lenslet array. It is therefore often preferred to have the step scanner upstream of the wavefront modulator.

The lenslet array can advantageously be arranged at a distance from a pupil plane which is equal to or at least approximately equal to a focal length of the individual lenslets of the lenslet array. The wavefront modulator can then also be positioned at a distance from a pupil plane which is equal to or at least approximately equal to said focal length. Such an arrangement has the advantage that the entire wavefront modulator, in particular all the pixels of the wavefront, is or are used for the generation of the shaped waves.

The components wavefront modulator, device for imposing variably stepped phase shifts (i.e. the step scanner), and the lenslet array can, in principle, be arranged in any order upstream from the microscope objective. In a preferred embodiment, the wavefront modulator, the device for imposing variably stepped phase shifts, and the lenslet array are, in each case, arranged planes in the excitation beam path upstream from the microscope objective which are, in each case, optically conjugate to each other.

In a further variant, the lenslet array is arranged immediately adjacent to the wavefront modulator, in particular such that the lenslet array is in direct contact with the wavefront modulator.

In principle, it is also possible to achieve the effect of a lenslet array by suitably driving the wavefront modulator. In a preferred variant of the method according to the invention the wavefront modulator 40 is driven such that the shaped waves are additionally subjected to phase shifts which emulate the effect of a lenslet array.

Again, it would be preferred to arrange the wavefront modulator at a distance from a pupil plane which is equal to or at least approximately equal to a focal length of the individual lenslets of the emulated lenslet array.

As a set out above, the interference focus created by interference of the shaped waves can be scanned by changing the relative phase among corrections for different shaped waves on the wavefront modulator. The apparatuses and methods for changing the relative phase determine the speed of focus scanning. In the following, several innovations for changing the relative phase at a faster speed, which can also be named step-phase scanning, will be presented.

E.g., around one hundred waves can be generated and superposed where each of the waves is corrected for a scattering medium with many independent pixels on the wavefront modulator, for example on an SLM. To move the corrected focus, i.e. the focal volume, to different points on the image plane, it is only necessary to update the overall phase for each corrected wave, i.e. altogether only one hundred phase shifts have to be updated. In principle this enables a very fast scanning.

In an effort to move the interference focus, i.e. the focal volume, toward a specific direction on the image plane, the relative phase differences will have to have a stepped increase or decrease toward the specific direction. Manipulating the step size of the phase differences therefore determines the moving distance of the focus.

More specifically, preferred embodiments of the inventive apparatus and advantageous variants of the method according to the invention are characterized in that the magnitude of the imposed phase shift on each of the shaped waves is a linear function of the position of the center of the intensity distribution of the respective shaped waves in the plane of the wavefront modulator.

Since, for a transparent sample, the electromagnetic field distribution in a certain plane is a spatial Fourier-transform of the electromagnetic field distribution in a corresponding Fourier plane, it can be preferable to avoid periodic structures in the plane of the wavefront manipulator. A preferred embodiment of the inventive apparatus and an advantageous variant of the inventive method is therefore characterized in that the centers of the intensity distributions corresponding to each of the shaped waves in the plane of the wavefront modulator are localized on a non-uniform grid. Non-uniform means in particular that the configuration of the centers corresponding to each of the shaped waves in the plane of the wavefront modulator contains a broad distribution of spatial frequencies. Artifacts resulting from a periodic distribution of the centers can thereby be avoided.

In principle, it is important for the wavefront modulator to impose the necessary corrections such that, in fact, planar wavefronts reach the focal plane in the sample, irrespective at this point of the spatial extension of these planar wavefronts.

In an effort to direct most of the electromagnetic energy into the relevant sample region, however, preferred embodiments of the inventive apparatus are characterized in that the control device is designed for driving the wavefront modulator such that the shaped waves resemble apodized plane waves on or in the sample. Correspondingly, variants of the inventive methods are preferred where at least some of and in particular all of the shaped waves resemble apodized plane waves in a focal plane on or in the sample.

If a suitable wavefront modulator, in particular a fast enough wavefront modulator is available, a realization of the method of the invention can be preferred where the stepped phase shifts are variably imposed on the shaped waves with the same wavefront modulator that generates the shaped waves. In this embodiment all corrections for scattering volumes can be carried out by one single, preferably high-resolution, wavefront modulator in parallel.

If higher scanning speeds are desired, it is generally preferable that the device for imposing variable stepped phase shifts is separated from the wavefront modulator that generates the shaped waves as such. The general idea of a group of solutions is to use a separate specialized hardware to bring about the relative phase offsets according to the invention. In this scenario, the specialized hardware only needs to manipulate the wavefront as a surface with comparatively few different step sizes. The specialized hardware can, in this context, also be termed as a "step-phase scanner".

As opposed to conventional scanning where a tilt is imposed to the phase of a wavefront for example by tilting scanning mirrors, in step-phase scanning not a tilt but rather steps or staircase-shapes are added to the phase of the wavefront.

With regard to the device for imposing variable stepped phase shifts there are a plurality of options that will be set out in the following. Since it is generally desired to move a focus in two independent directions in a focal plane, the phase offsets also need to be applied in two directions, most conveniently termed x- and y-direction, relative to an optical axis.

The device for imposing variable stepped phase shifts as such can in principle be arranged in the excitation beam path downstream of the wavefront modulator. In preferred embodiments of the invention, the device for imposing variable stepped phase shifts is arranged upstream of the wavefront modulator.

In a first and rather simple realization of the inventive apparatus, the device for imposing variable stepped phase shifts comprises at least one separate wavefront modulator which is, in particular, arranged in or near a plane which is optically conjugate to the plane where the wavefront modulator is arranged. With regard to the inventive method, a separate wavefront modulator or step-phase scanner, preferably a wavefront modulator that, compared with the wavefront modulator generating the shaped waves, is faster and can be operated in a lower resolution, can be used to bring about varying magnitudes of the steps of the imposed phase shifts.

In principle, many physical and optical effects can be used to achieve phase offsets.

For example, an optical path length can be manipulated by the electro-optic effect in staircase-shaped media. The underlying physical principle is that, when a light wave travels through a medium with a higher refractive index, its phase will be delayed. Consequently, traveling through media with the same refractive index but different thicknesses will lead to different extents of phase delays. Now, a component can be manufactured from an optically isotropic material to a staircase or stepped shape. Passing a, preferably apodized, plane wave through such a component will result in a step-phase wavefront because different parts of the input wavefront experience a different thickness of the staircase-shaped medium and therefore are subjected to a different optical path. If the refractive index of the staircase-shaped medium can be manipulated, then the phase delay and the step size after passing through the medium can be changed accordingly. Media such as KTN crystal (KTa1-xNbxO3) shows a strong electro-optic effect (namely, Kerr effect). Applying strong electric field across it can change its refractive index. So, a staircase shape medium with efficient electro-optic effect can be used to be a step-phase scanner.

Due to the underlying electro-optic effect, these solutions enable a very fast switching of the imposed phase shifts.

A preferred embodiment of the apparatus according to the invention is characterized in that the device for imposing variable stepped phase shifts comprises at least one electro-optic component, in particular at least one anisotropic crystal, with a stepped thickness, arranged in particular in or near a plane which is optically conjugate to the plane where the wavefront modulator is arranged, and a driving device for applying varying voltages to the at least one electro-optic component to bring about varying magnitudes of the steps of the imposed phase shifts.

With the term electro-optic component, we mean a component made from a material showing a significant electro-optic effect as described above.

A corresponding variant of the inventive method comprises the step of applying varying voltages to the at least one electro-optic component, particularly the at least one anisotropic crystal, to bring about varying magnitudes of the steps of the imposed phase shifts.

The anisotropic crystal has regions of different thickness, where each region corresponds to the location of each of the shaped waves in the plane of the wavefront modulator.

A more specific embodiment making use of phase offsets achieved by optically anisotropic crystals in two dimensions therefore is characterized in that the device for imposing variable stepped phase shifts comprises a first stepped electro-optic component, arranged in particular in or near a plane which is optically conjugate to the plane where the wavefront modulator is arranged, where the thickness of the first stepped electro-optic component increases stepwise in a first direction perpendicular to the direction of the optical axis and a second stepped electro-optic component, arranged in particular in or near a plane which is optically conjugate to the plane where the wavefront modulator is arranged, where the thickness of the second stepped electro-optic component increases stepwise in a second direction perpendicular both to the direction of the optical axis and the first direction.

A further solution that is also based on applying different optical path lengths in a specialized component makes use of so-called stacked gradient-refractive index glass components, also termed GRIN stacks. Such components have a refractive-index gradient in a longitudinal direction and in a transverse direction the refractive-index varies in steps. As a consequence of different longitudinal gradients in different tracks, the sizes of the refractive-index steps therefore vary in different transverse planes and, correspondingly, the steps of imposed phase shifts very in dependence upon the transverse planes through which the light is guided.

A preferred embodiment making use of these principles is characterized in that the device for imposing variably stepped phase shifts comprises at least one stacked gradient refractive-index glass component, arranged in particular in or near a plane which is optically conjugate to the plane where the wavefront modulator is arranged, and at least one x-y-scanner, wherein, for imposing variably stepped phase shifts upon the shaped waves, the x-y-scanner guides the excitation light onto different sections of the at least one stacked gradient refractive-index glass component. A corresponding variant of the inventive method comprises the step of directing the excitation light to varying sections of the at least one stacked gradient refractive-index glass component to bring about varying magnitudes of the steps of the imposed phase shifts.

The spacing between adjacent gradient tracks corresponds to the spacing of adjacent centers of the intensity distribution for each of the shaped waves in the plane of the wavefront modulator. It may be expedient in this regard to install magnifying or demagnifying components.

More specifically, in the apparatus according to the invention, the device for imposing variable stepped phase shifts can preferably comprise a first stacked gradient refractive-index glass component, arranged in particular in or near a plane which is optically conjugate to the plane where the wavefront modulator is arranged, where the gradient of the refractive-index increases in a first direction perpendicular to the direction of the optical axis and a second stacked gradient refractive-index glass component, arranged in particular in or near a plane which is optically conjugate to the plane where the wavefront modulator is arranged, where the gradient of the refractive-index increases in a second direction perpendicular to the direction of the optical axis and perpendicular to the first direction.

In this regard, an embodiment of the apparatus according to the invention may be preferred where optical means, comprising in particular at least one cylindrical lens, are present for forming a light sheet of excitation light and for guiding the light sheet onto different sections of a stacked gradient refractive-index glass component.

Another group of solutions makes use of geometrically different optical paths to achieve stepwise change of the phase shifts between different shaped waves. A first example of such a solution uses an array of stepped mirrors, also termed as a corner mirror.

In an embodiment of the apparatus according to the invention, the device for imposing variable stepped phase shifts can advantageously comprise at least one array of corner mirrors with a one-dimensional structure, arranged in particular in or near a plane which is optically conjugate to the plane where the wavefront modulator is arranged.

A one-dimensional structure in this context means that the structure of the corner mirror extends only in one dimension on the surface of the component. For example, the corner mirror can have a plurality of slanted or tilted mirror facets extending in parallel in one direction. Preferably, the tilt angle is equal for all the mirror facets. The lateral spacing of the mirror facets corresponds to the spacing of the centers of the intensity distribution for each of the shaped waves in the plane of the wavefront modulator.

A corresponding variant of the inventive method comprises the step of variably tilting the at least one array of corner mirrors with a one-dimensional structure to bring about varying magnitudes of the steps of the imposed phase shifts.

More specifically, in the apparatus according to the invention, the device for imposing variable stepped phase shifts can preferably comprise a first array of corner mirrors with a one-dimensional structure, arranged in particular in or near a plane which is optically conjugate to the plane where the wavefront modulator is arranged, where a direction of the one-dimensional structure is oriented in a first direction perpendicular to the direction of the optical axis and a second array of corner mirrors with a one-dimensional structure, arranged in particular in or near a plane which is optically conjugate to the plane where the wavefront modulator is arranged, where a direction of the one-dimensional structure is oriented in a second direction perpendicular to the direction of the optical axis and perpendicular to the first direction.

Advantageously, such arrays of corner mirrors can be mounted on conventional scanners, e.g. galvanometric scanners.

Further embodiments that employ geometrically different path lengths use a conventional two-dimensional (2D) x-y-scanner, like e.g. a galvanometric- or a MEMS-scanner.

Also, a DMD (Digital Mirror Device) or similar adaptive elements can be used to impose different tilts to the wavefront. The individual tilts of the mirrors of the DMD are the same as the tilt of the x-y-scanner but with opposed sign. Therefore, locally, all tilts in the wavefront are compensated but the overall tilt remains and is realized in steps.

In an embodiment of the apparatus according to the invention, the device for imposing variable stepped phase shifts can advantageously comprise an x-y-scanner, arranged in particular in or near a plane which is optically conjugate to the plane where the wavefront modulator is arranged, and a digital-mirror-device, positioned in particular in or near a plane which is optically conjugate to the plane where the wavefront modulator is arranged.

A corresponding variant of the inventive method is characterized in that, for imposing the variable stepped phase shifts upon the shaped waves, the excitation light is guided via an x-y-scanner, arranged in particular in or near a plane which is optically conjugate to the plane where the wavefront modulator is arranged, and a digital-mirror-device, positioned in particular in or near a plane which is optically conjugate to the plane where the wavefront modulator is arranged, wherein each of the segments of the digital-mirror-device is operated in coordination with the x-y-scanner to cancel out phase ramps imposed by the x-y-scanner.

A further preferred embodiment employs the following principles: When a shaped wave is incident on a scanner it acquires a linear phase ramp. Individual portions of this tilted shaped wave are now made to pass through different lenses of a lens array, preferably a lenslet array, which lenses focus the radiation, in each case, on a mirror arranged in a distance of a focal length. The effective path from the scanner via the lenses to the mirror and back from the mirror through the lenses to the scanner now cause, in each case, the phase ramp to be rotated laterally, thus rotating the tilt of the wavefront. The global phase acquired on the scanner however remains unchanged, so that a second reflection on the scanner reverses the rotated tilt but doubles the global phase, leading to the desired stepped phase.

In an embodiment of the apparatus according to the invention, the device for imposing variable stepped phase shifts can advantageously comprise an x-y-scanner, arranged in particular in or near a plane which is optically conjugate to the plane where the wavefront modulator is arranged, a lenslet array, and a fixed mirror wherein the excitation light is guided from the x-y-scanner via the lenslet array to the fixed mirror, is then reflected by the fixed mirror back through the lenslet array and is then guided via the x-y-scanner in the direction of the objective.

A corresponding variant of the inventive method is characterized in that, for imposing the variable stepped phase shifts upon the shaped waves, the excitation light is guided via an x-y-scanner, arranged in particular in or near a plane which is optically conjugate to the plane where the wavefront modulator is arranged, and via a lenslet array to a fixed mirror, that the excitation light is then reflected by the fixed mirror back through the lenslet array and is then guided via the x-y-scanner in the direction of the objective, wherein, for varying the magnitude of the steps of the phase shifts between different shaped waves, the x-y-scanner is operated.

In a preferred variant of this embodiment, a beam splitter can be provided between the wavefront modulator and the x-y-scanner, the fixed mirror can preferably be slightly tilted with respect to an optical axis, and the light reflected from the fixed mirror can be deflected, e.g. by total reflection, by the beam splitter in the direction of the objective. The beam splitter can be any kind of beam splitter, e.g. a 50/50- or a polarizing beam splitter.

Possible crosstalk problems of the solution using a lens-array and a fixed mirror can be avoided by passing through the lens-array only once. In such an embodiment, a shaped wave acquires a phase ramp on a scanner before hitting a lens-array. Behind the lens-array, a multitude of focal points is formed which have a lateral shift but also a relative phase shift with respect to each other, both, the lateral shift and the phase shift, depending on the angle of the shaped wave with respect to the optical axis. The reason for this that a wave travels a longer distance to reach the bottom lens than it does to reach the top lens. The shift of the spots is reversed through descanning by means of a second scanner using a single lens rather than a lens array. This keeps the relative phase shifts between the individual resulting shaped wave segments.

In preferred embodiments of the apparatus according to the invention, the device for imposing variable stepped phase shifts can comprise a first x-y-scanner, arranged in particular in or near a plane which is optically conjugate to the plane where the wavefront modulator is arranged, a lenslet array and a lens arranged downstream of the first x-y-scanner and a second x-y-scanner, arranged in particular in or near a plane which is optically conjugate to the plane where the wavefront modulator is arranged, downstream of the lenslet array and the lens.

A corresponding advantageous variant of the inventive method is characterized in that, for imposing the variable stepped phase shifts upon the shaped waves, the excitation light is guided via a first x-y-scanner, arranged in particular in or near a plane which is optically conjugate to the plane where the wavefront modulator is arranged, a lenslet array and a lens arranged downstream of the first x-y-scanner and a second x-y-scanner, arranged in particular in or near a plane which is optically conjugate to the plane where the wavefront modulator is arranged, downstream of the lenslet array and the lens, and wherein, for varying the magnitude of the steps of the phase shifts between different shaped waves, the first x-y-scanner and the second x-y-scanner are operated, and wherein the second x-y-scanner is operated in coordination with the first x-y-scanner to cancel out phase-ramps imposed onto the shaped waves by the first x-y-scanner.

Further embodiments employ the following principles: When a shaped wave impinges on a scanner it acquires, as noted before, a linear phase ramp. The mirror plane can now be imaged, using e.g. a 4f-setup, onto a plane containing an array of sub-diffraction apertures. From each aperture a spherical wave will emanate, which carries the relative phase corresponding to the acquired phase gradient at the micro-aperture's position.

In preferred embodiments of the apparatus according to the invention, the device for imposing variable stepped phase shifts can comprise an x-y-scanner, arranged in or near a plane which is optically conjugate to the plane where the wavefront modulator is arranged, a spatial filter with a plurality of apertures downstream of the x-y-scanner and a lenslet array downstream of the spatial filter.

To improve the light efficiency of this setup, the initial shaped wave can be pre-focused using a lenslet array so that more light is concentrated on the micro-apertures.

Thus, the device for imposing variable stepped phase shifts can advantageously comprise additionally a lenslet-device between the x-y-scanner for focusing excitation light into the apertures of the spatial filter.

Further embodiments where the necessary variable steps in the phase shifts are brought about by different actual geometrical path lengths employ so-called plateau mirrors which can also be termed as staircase-shaped mirrors.

Such mirror components have, in principle, the form of a staircase with slowly increasing step heights. Depending on where a beam is incident on the staircase, phase shifts with varying magnitudes of the steps will be imposed on the wavefront of the incident beam. The slow variation in the step heights within this resulting wave front could, if necessary, be corrected for example by another stationary plateau mirror.

In preferred embodiments of the apparatus according to the invention the device for imposing variable stepped phase shifts can comprise at least one staircase-shaped mirror, arranged in or near a plane which is optically conjugate to the plane where the wavefront modulator is arranged, where the heights of the stairs increase in one direction, and an x-y-scanner, wherein, for imposing variably stepped phase shifts upon the shaped waves, the x-y-scanner guides the excitation light onto different sections of the staircase-shaped mirror.

More specifically, the device for imposing variable stepped phase shifts can comprise a first staircase-shaped mirror, arranged in or near a plane which is optically conjugate to the plane where the wavefront modulator is arranged, where the heights of the stairs increase in a first direction perpendicular to the direction of an optical axis and a second staircase-shaped mirror, arranged in or near a plane which is optically conjugate to the plane where the wavefront modulator is arranged, where the heights of the stairs increase in a second direction perpendicular to the direction of the optical axis and perpendicular to the first direction.

In an effort to avoid extreme differences in the optical path lengths, it may be preferred to use staircase-shaped mirrors with a plurality of staircase-elements, where the individual staircase-elements have approximately equal heights, while retaining the necessary feature of increasing heights of the stairs. Such components would make use of the same principle as Fresnel-lenses.

In a further preferred embodiment, optical means, comprising in particular at least one cylindrical lens, are present for forming a light sheet of excitation light and for guiding the light sheet onto different sections of a staircase-shaped mirror.

A corresponding advantageous variant of the method according to the invention is characterized in that the device for imposing variable stepped phase shifts comprises at least one staircase-shaped mirror, arranged in particular in or near a plane which is optically conjugate to the plane where the wavefront modulator is arranged, where the heights of the stairs increase in one direction, and that, to bring about varying magnitudes of the steps of the imposed phase shifts, the excitation light is guided onto different sections of the staircase-shaped mirror.

It may be preferred to form a light sheet of excitation light and to guide the light sheet onto different sections of the staircase-shaped mirror or the stacked gradient refractive-index glass component, respectively.

In expedient embodiments of the apparatus according to invention at least one beam splitter, preferably a polarizing beam splitter or a 50/50-beam splitter, can be arranged upstream or downstream of the wavefront modulator.

In further preferred embodiments, the device for imposing variably stepped phase shifts would comprise an optical phased array.

Phased arrays are known from ultrasound and radar technology. They comprise a number of emitters which generate spherical waves. The relative phase of these spherical waves can then be controlled individually. This allows different superpositions of waves which result in a desirable output wave which can be a plane wave or a spherical wave seemingly emanating from virtual source which can be freely positioned. The principle is illustrated in https://en.wikipedia.org/wiki/Phased array ultrasonics.

The same principle can be adopted in optics. Photonic integrated circuits (PIC) are a good means of bringing a large number of individually modifiable optical channels to a system.

By arranging the output channels in a 2-dimensional grid and placing a collimating lens-array behind it (to transform the spherical output waves into plane wave patches), one could easily realize a step scanner, i.e. in a device for imposing variably stepped phase shifts, as required for an apparatus according to the invention.

The microscope according to the invention can have a main beam splitter in the detection beam path, particularly a dichroic beam splitter, for the separation of excitation light and detection light.

The detector of the inventive microscope can, particularly in the case of a twophoton-microscope, be arranged in a non-descanned portion of the detection beam path.

The microscope according to the invention can be a multi-photon-fluorescence microscope, in particular a 2-photon-fluorescence microscope or a 3-photon-fluorescence microscope, a SHG-microscope, a THG-microscope, or a CARS-microscope.

BRIEF DESCRIPTION OF THE DRAWINGS

Further advantages and properties of the invention will be described in the following with reference to the accompanying figures.

DETAILED DESCRIPTION OF THE DRAWINGS

Equal and equivalent components generally have the same reference numbers in the figures.

Figure 1:
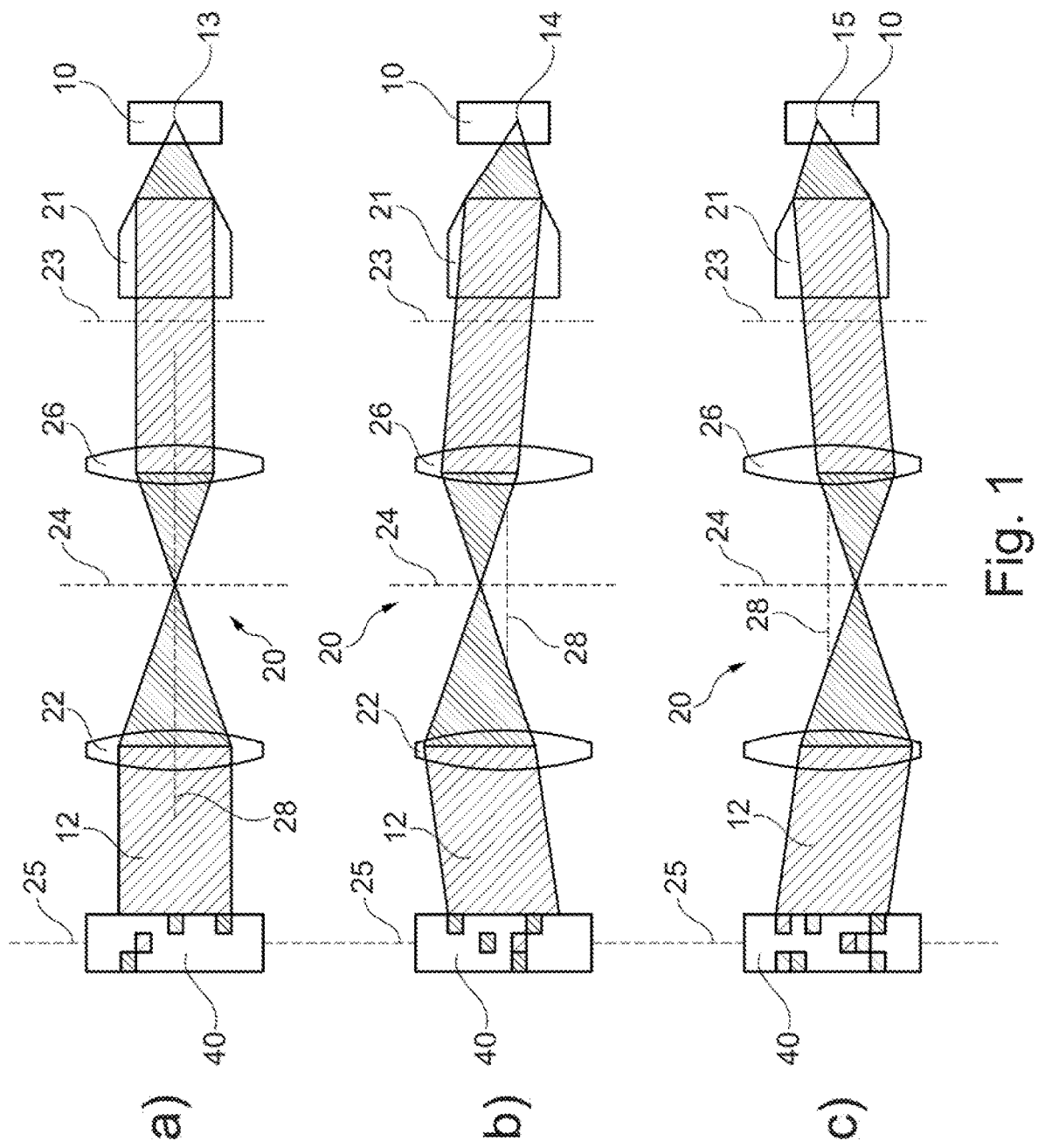
FIG. 1 illustrates in schematic representations the underlying technical objective.
Figure 2:
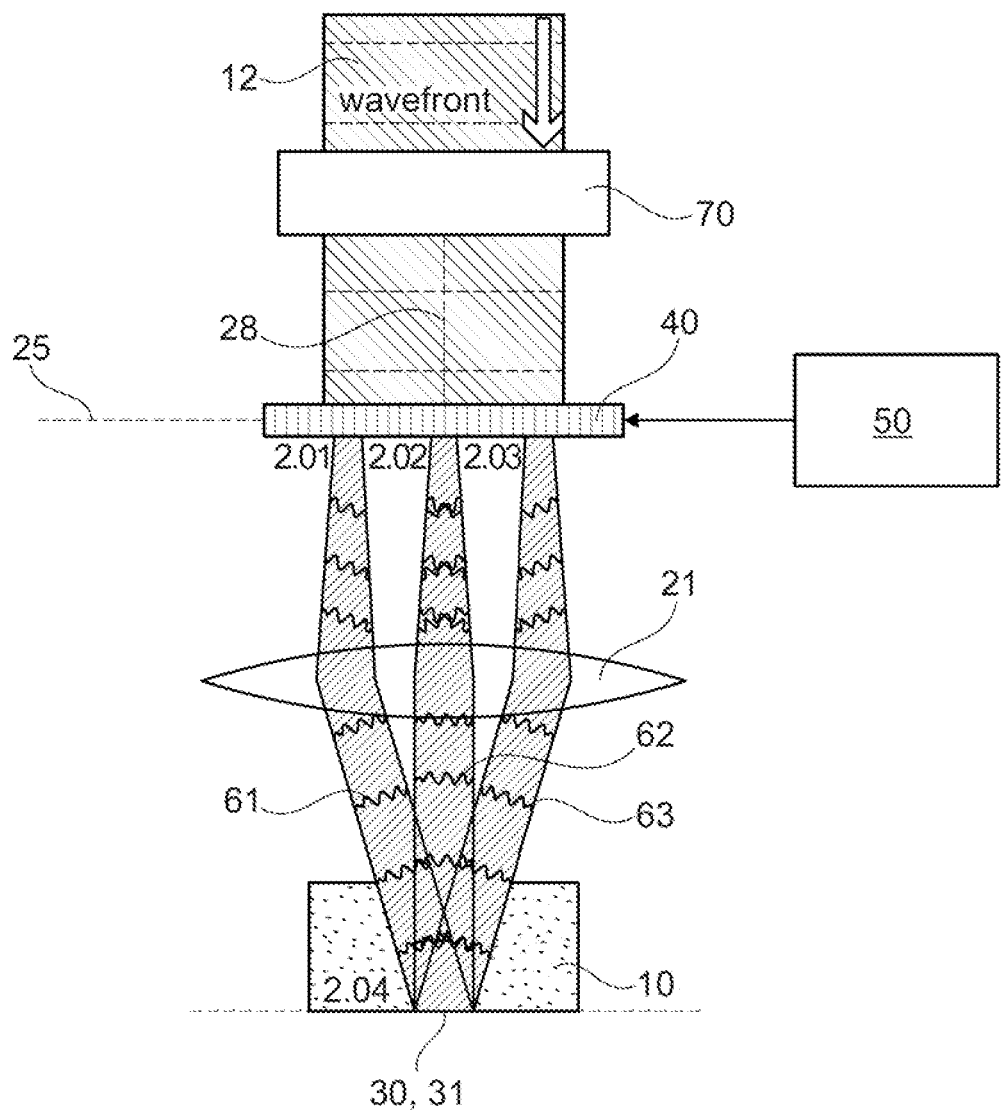
FIGS. 2 and 3 illustrate the general principle of the invention.
Figure 3:
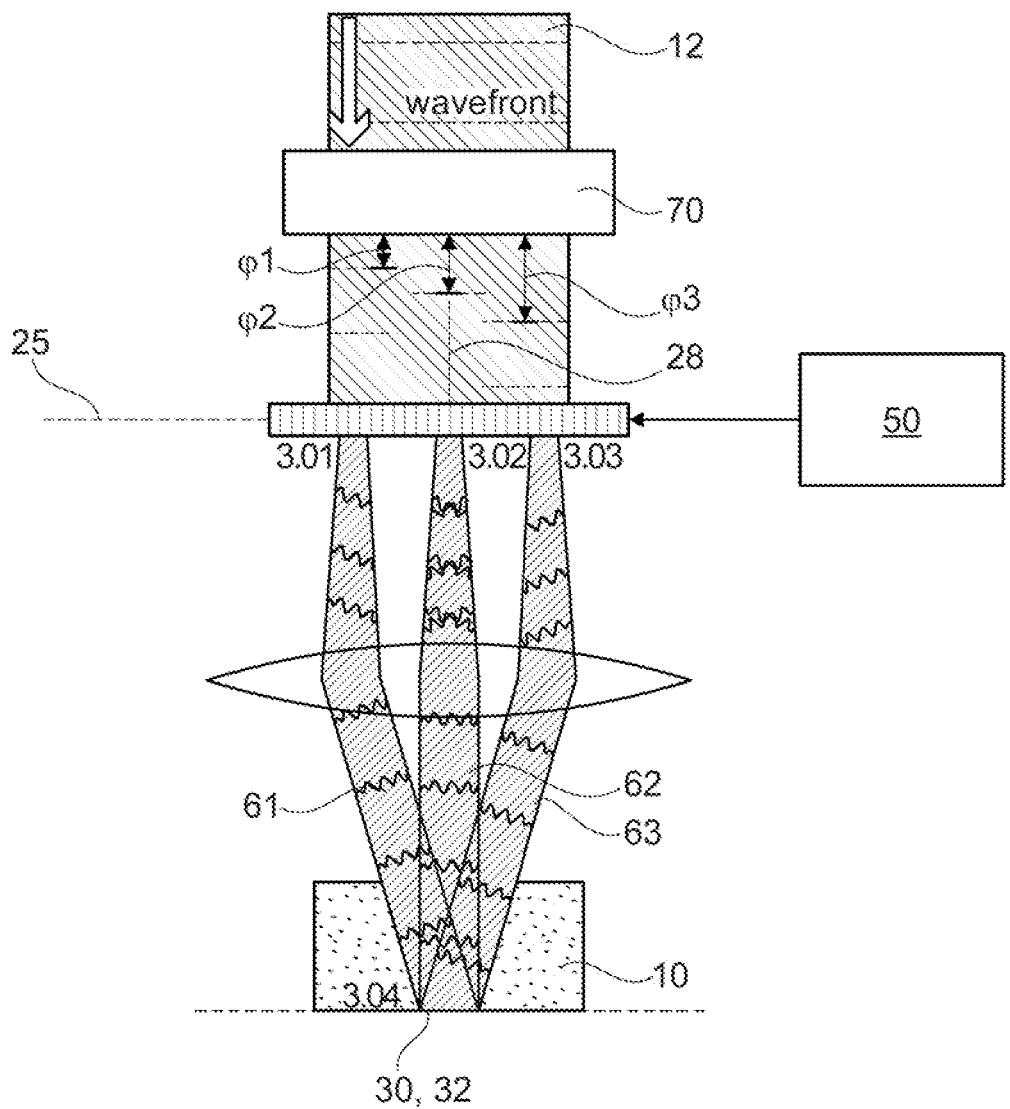

The general principles of the invention are explained in relation to FIGS. 2 and 3 which show schematically an embodiment of an apparatus according to the invention. Identical reference numbers in FIGS. 2 and 3 denote identical entities.

An incoming wavefront of excitation light 12 impinges on a device 70 for imposing variably stepped phase shifts. Downstream of the device 70 the wavefront modulator 40 is arranged close to a pupil plane 25 of a microscope objective 21. For driving the wavefront modulator 40 a control device 50 is schematically shown. According to the invention, the control device 50 is designed for driving the wavefront modulator 40 to generate a predefined number of shaped waves on or in a sample 10. Downstream of the wavefront modulator 40 the excitation light 12 is incident on the microscope objective 21 which focuses the excitation light 12 into a focal plane in a sample 10.

In FIGS. 2 and 3 by way of example three shaped waves 61, 62, 63 are shown which, in each case, are characterized by a specific angle in relation to an optical axis 28.

It has to be understood that, as set out above in this description, that the portions of the electromagnetic radiation denoted by the reference numbers 61, 62, 63 immediately downstream of the microscope objective 21 are, strictly speaking, not plane waves. It is an essential feature of the invention that the device 70 is driven such that the portions 61, 62, 63 of the electromagnetic radiation, on their way through the sample 10 and through the action of scattering and aberration processes, develop, at least approximately, into plane waves at the focal plane within the sample. The focus 30 is generated at a specified location 31, 32 on or in the sample 10 by superposition of the shaped waves 61, 62, 63 which, in the focal plane, resemble in each case plane waves.

The device 70 serves the purpose of imposing variably stepped phase shifts $\varphi1$, $\varphi2$, $\varphi3$ upon the shaped waves 61, 62, 63.

For manipulating the location 31, 32 of the focus 30 on or in the sample 10, according to the invention, the magnitude of the steps of the phase shifts $\varphi1$, $\varphi2$, $\varphi3$ between different shaped waves 61, 62, 63 is varied. This is illustrated in FIGS. 2 and 3. In FIG. 2, the device 70 does not impose any phase shifts on the incoming wavefront. In FIG. 3, stepped phase shifts $\varphi1$, $\varphi2$, $\varphi3$ are imposed on the incoming wavefront which, due to the stepped nature of the phase manipulation of the wavefront, correspond to individual phase shifts $\varphi1$, $\varphi2$, $\varphi3$ for each of the shaped waves 61, 62, 63, respectively. Due to these phase shifts $\varphi1$, $\varphi2$, $\varphi3$ the interference of the shaped waves in the focal plane of the sample 10 is changed and the focus 30 is shifted laterally to a location 32 different from location 31 of FIG. 2.

A first realization of a setup as shown in FIGS. 2 and 3 would be to have a high resolution wavefront modulator 40, e.g. a 4K resolution spatial light modulator (SLM), which will be segmented to around 100 sectors. Each sector will be used for correcting different volumes in a scattering medium to produce superposed apodized plane waves in an image or focal plane thereby implementing the method and the apparatus according to the invention.

Figure 11:
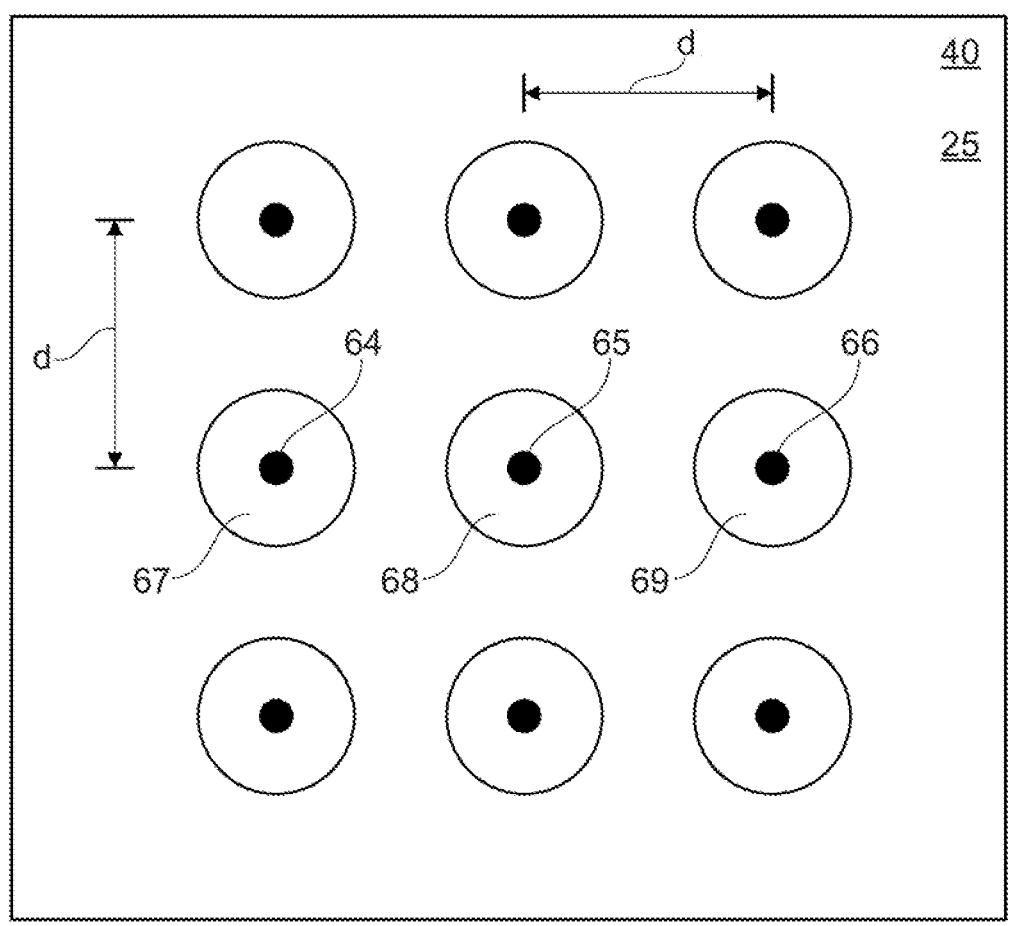
FIG. 11 illustrates schematically the distribution of correction regions in a plane of a wavefront modulator.

FIG. 11 schematically illustrates this situation. A wavefront modulator 40, e.g. a high-resolution spatial light modulator, is, e.g., arranged close to a pupil plane 25. If no corrections would be necessary, the plane waves 61, 62, and 63 at the focal plane in the sample 10 would, due to the laws of Fourier-optics, correspond to points 64, 65 and 66 in the plane of the wavefront modulator 40. The pixels of the wavefront modulator 40 in the regions 67, 68 and 69 around the centers 64, 65 and 66, respectively, serve, in each case, the purpose of achieving the necessary corrections. Of course, FIG. 11 is a schematic drawing. The regions 67, 68, and 69 will generally not have a circular shape. In the schematic drawing of FIG. 11, the centers 64, 65 and 66 are on a rectangular grid with the distance d in both coordinate-directions. In a realistic scenario, this would have to be avoided, as set out in the description above, to avoid artifacts due to Fourier-optics.

Returning now to FIGS. 2 and 3, the device 70 can, in this embodiment, be realized by a low resolution, but high refresh rate wavefront modulator, e.g. a deformable mirror. According to the invention, this second wavefront modulator, i.e. the device 70, will be used to manipulate the differences, i.e. the step sizes, of relative phase shifts among the superposed apodized plane waves 61, 62, 63 in order to move the interference focus, i.e. the focus 30, as described.

In this scenario, the additional low-resolution wavefront modulator 40 which realizes the device 70 is proposed to achieve faster switches of the relative phases as compared to existing wavefront modulators.

In principle, however, the functions of the wavefront modulator 40 and the device 70 can be achieved by one and the same wavefront modulator. Future novel wavefront modulators might have high resolution as well as fast updating rates which can satisfy the necessary imaging speed. In this case, the additional step-phase scanning can be integrated into such a high-resolution wavefront modulator and no further component would be necessary.

Embodiments of apparatuses and variants of methods for manipulating a focus of excitation light 12 on or in a sample 10 will be described in the following with reference to FIGS. 12 and 13.

Figure 12:
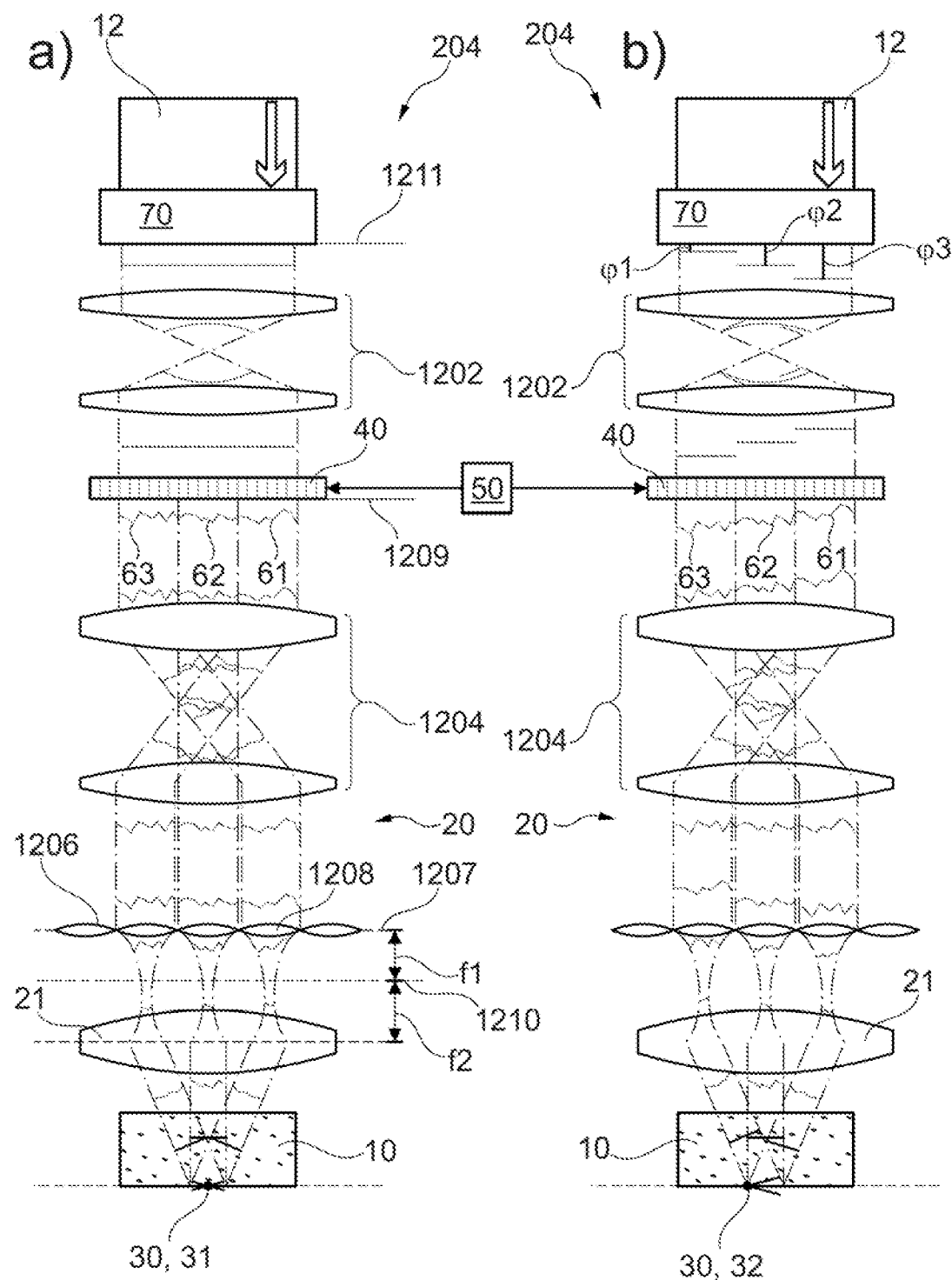
FIG. 12 illustrates schematically an embodiment of an apparatus according to the invention for manipulating a focus of excitation light on or in a sample.

FIG. 12 shows schematically an embodiment of an apparatus 204 for manipulating a focus 30 of excitation light 12 on or in a sample 10 in two different situations a) on the left and b) on the right.

The apparatus 204 comprises as essential components a light source (not shown) for emitting excitation light 12 and excitation beam path 20 for guiding the excitation light 12 onto or into the sample 10. The excitation beam path 20 comprises an objective 21 for guiding the excitation light 12 onto or into the sample 10 and a wavefront modulator 40 for modulating the excitation light 12. For driving the wavefront modulator 40 a control device 50 is present. According to the invention, the control device 50 is designed for driving the wavefront modulator 40 to generate a number of shaped waves 61, 62, 63 on or in the sample 10. According to the invention, a focus 30 is generated at specified locations 31, 32 on or in the sample 10 by superposition of the shaped waves 61, 62, 63. For manipulating the location 31, 32 of the focus 30 on or in the sample 10, a device 70 for imposing variably stepped phase shifts $\varphi1$, $\varphi2$, $\varphi3$ upon the shaped waves 61, 62, 63 is present, where the phase shifts $\varphi1$, $\varphi2$, $\varphi3$ imposed in each case on the shaped waves change stepwise between different shaped waves 61, 62, 63.

In the specific embodiment of FIG. 12, the excitation light 12 arrives in planar wavefronts at the device 70 for imposing variably stepped phase shifts which is arranged in a plane 1211 and enters the device 70. The device 70 can also be termed as step scanner 70.

In the situation shown in FIG. 12 a), the effect of the step scanner 70 is neutral, i.e. the planar wavefronts exit the step scanner 70 unchanged. In the situation shown in FIG. 12 b), stepped phase shifts $\varphi1$, $\varphi2$, $\varphi3$ are imposed on the portions of the planar wavefronts which portions further downstream develop, by the action of the wavefront modulator 40, into the shaped waves 61, 62, 63.

For adapting the beam diameter between the step scanner 70 and the wavefront modulator 40 telescope lenses 1202 can be present.

The excitation light 12 then enters the wavefront modulator 40 which, according to the invention, serves the purpose of generating a number of shaped waves 61, 62, 63. The wavefront modulator 40 is arranged in a plane 1209. The shaped waves 61, 62, 63 are also depicted schematically in FIG. 12. Immediately downstream of the wavefront modulator 40 further telescope lenses 1204 are present which, again, serve for adapting the beam diameter. in this instance, the telescope lenses serve the purpose of adapting the diameter of the beam exiting the wavefront modulator 40 to a lenslet array 1206 which is arranged in a plane 1207.

In other embodiments, instead of the telescope lenses 1202 and/or 1204 a vario- or a zoom optics can be used.

The dimensions of the optics between the wavefront modulator 40 and the lenslet array 1206 are chosen such that each of the shaped waves 61, 62, 63 generated by the wavefront modulator 40 is incident on one individual lenslet 1208 of the lenslet array 1206. The individual lenslets 1208 guide the shaped waves 61, 62, 63, in each case, to a focal plane 1210 which can be coincident with a back focal plane 23 of the objective 21. f1 is the focal length of each of the individual lenslets 1208 and f2 is the back focal length of the objective 21.

The objective 21 then guides the shaped waves 61, 62, 63 to a focal plane in the sample 10. It is particularly preferred that each of the shaped waves 61, 62, 63 is corrected for influences of the sample 10 such that the shaped waves 61, 62, 63 resemble planar wavefronts in a focal plane on or in the sample 10. This is also schematically shown in FIG. 12 where the shaped waves 61, 62, 63, develop, at least approximately, into planar and, more specifically, apodized, wavefronts on their way to the focus 30. The focus 30 as such is generated by superposition, i.e. interference, of the shaped waves 61, 62, 63 and the location of the focus 30 is defined by the relative phases between the shaped waves 61, 62, 63. Consequently, the location of the focus 30 can, according to the methods of the invention, be varied by varying the phases between the shaped waves 61, 62, 63 in a stepwise manner by the action of the step scanner 70. In the situation shown in FIG. 12 a) the phase differences between each of the shaped waves 61, 62, 63 is zero and the focus 30 is generated on the optical axis. In the situation of FIG. 12 b) there are finite and stepwise phase shifts between the shaped waves 61, 62, 63 as imposed by the step scanner 70 which lead to a shift of the focus 30 from the optical axis to a location spaced from the optical axis.

Figure 13:
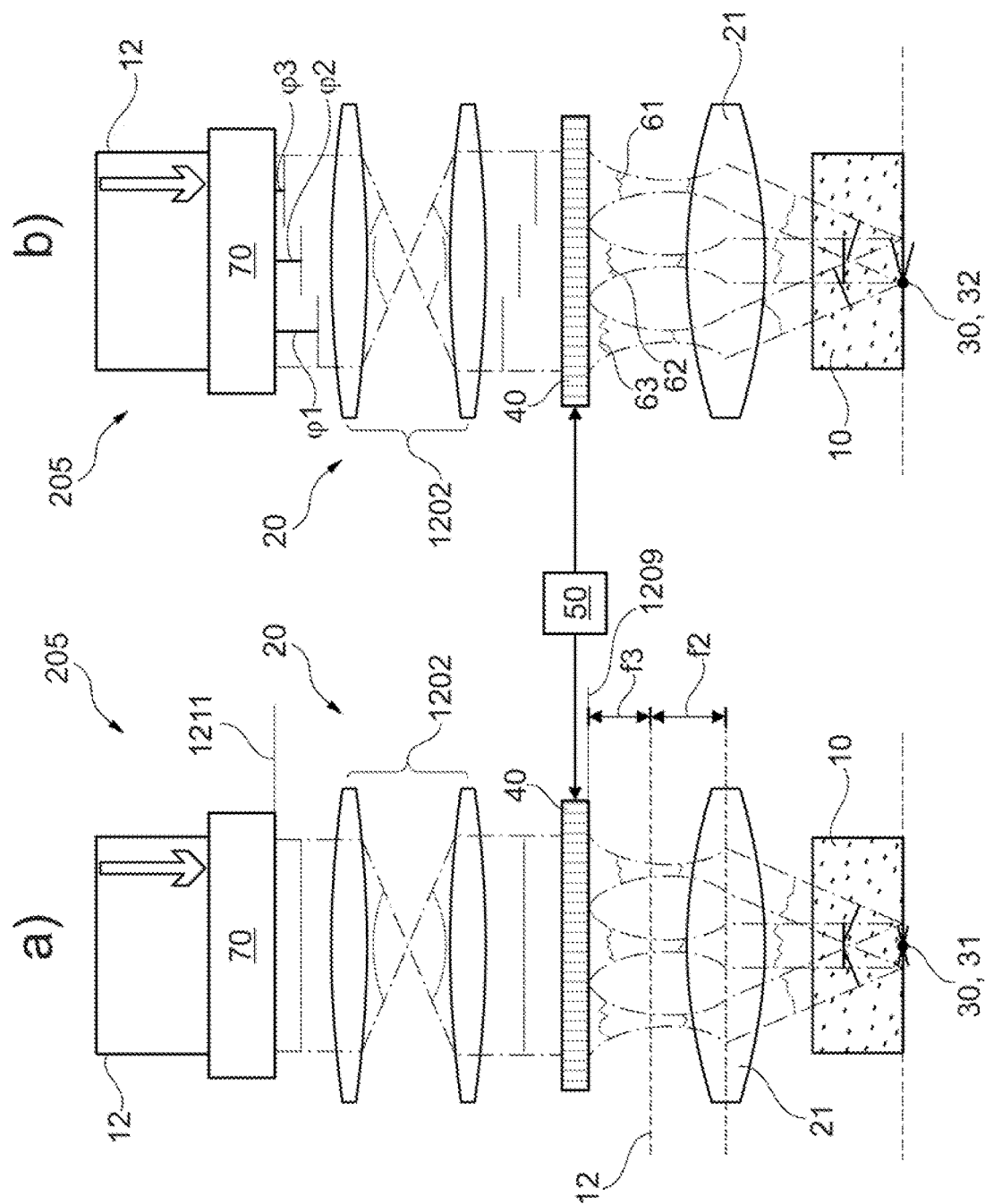
FIG. 13 illustrates schematically a further embodiment of an apparatus according to the invention for manipulating a focus of excitation light on or in a sample.

The embodiment of an apparatus 205 for manipulating a focus 30 of excitation light 12 shown in FIG. 13 is generally similar to the embodiment shown in FIG. 12. Therefore, only the differences are described here. Otherwise, the respective portions of the description of FIG. 12 also apply for FIG. 13.

The essential difference between FIG. 12 and FIG. 13 is that, in FIG. 13, there is no lenslet array and the function of the lenslet array is additionally achieved by a suitable driving of the wavefront modulator 40. More specifically, in addition to generating the shaped waves 61, 62, 63, the wavefront modulator 40 also imposes suitable phase shifts on the shaped waves 61, 62, 63 to emulate the effects of a lenslet array being arranged in the plane 1209 of the wavefront modulator 40 and having a focal length f3. An adaption of the beam diameter downstream of the wavefront modulator 40 is, consequently, not necessary in the embodiment of FIG. 13.

In principle, the wavefront modulator 40, the device 70 for imposing variably stepped phase shifts, i.e. the step scanner, and, if present, the lenslet array 1206 can be arranged anywhere and in any order in relation to each other in the excitation beam path upstream of the objective 21. Also, the wavefront modulator 40 can, in principle, be arranged either upstream or downstream from the device 70 for imposing variably stepped phase shifts.

It is preferred, however, that, as shown in FIGS. 12 and 13, the device 70 for imposing variably stepped phase shifts or at least a component of this device 70 is arranged in a plane 1211 which is optically conjugate to a plane 1209 where the wavefront modulator 40 is arranged.

If a lenslet array 1206 is present, as shown in FIG. 12, it is furthermore preferred that the lenslet array 1206 is arranged in a plane 1207 which is optically conjugate to the planes 1209 and 1211 in which the wavefront modulator 40 and the step scanner 70, respectively, are arranged.

If a lenslet array 1206 is present, as shown in FIG. 12, it is furthermore preferred that the lenslet array 1206 is arranged at a distance from a pupil plane which is equal to or at least approximately equal to a focal length f1 of the individual lenslets 1208 of the lenslet array 1206.

In the embodiments of FIGS. 12 and 13, the focal lengths f1 and f3 can be, e.g., a couple of millimeters. If the wavefront modulator 40, the step scanner 70, and the lenslet array 1206 are, in each case, arranged in planes which are optically conjugate to each other, it can then be said that the lenslet array 1206 in FIG. 12 and the wavefront modulator 40 and the step scanner 70 are, in each case, arranged close to a pupil plane. 'To be arranged close to' is to be understood here as to mean to be arranged in the range of the focal length f1 of the lenslet array 1206 or the focal length f3 of a lenslet array emulated by the wavefront modulator 40.

In a variant, the lenslet array 1206 can be arranged immediately adjacent to the wavefront modulator 40, in particular such that the lenslet array is in direct contact with the wavefront modulator 40.

These possibilities and preferred realizations for the arrangement of the wavefront modulator 40, the step scanner 70 and, if present, a lenslet array apply for all embodiments discussed in this description. It should also be clear that a feature that certain components are arranged in planes that are optically conjugate to each other has to be understood in a practical and not a mathematical sense.

Figure 4:
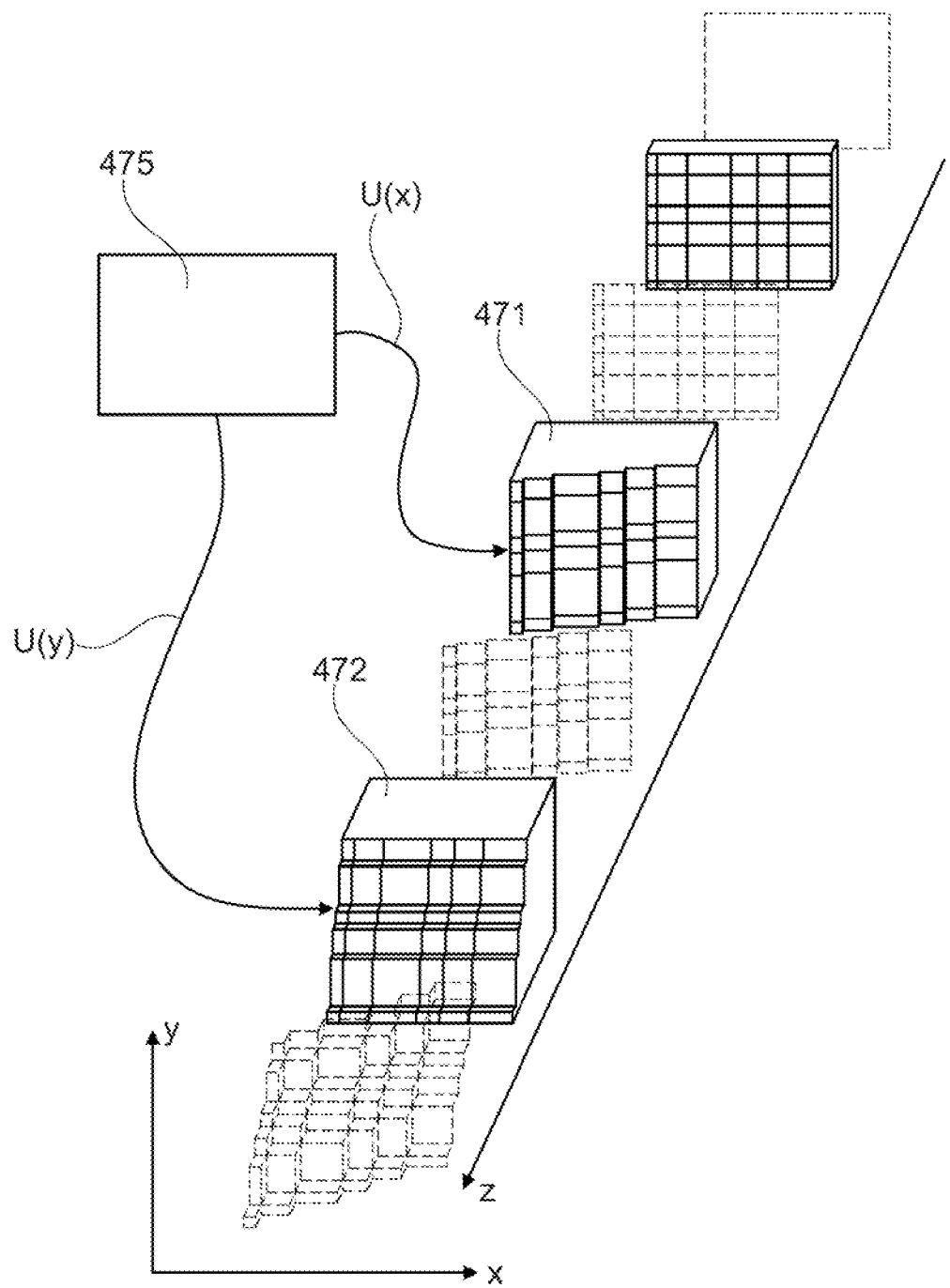
FIG. 4 illustrates schematically the principle of an embodiment of a device for imposing variable stepped phase shifts for an apparatus according to the invention.

A second realization of a device for manipulating the stepped phase shifts φ1, φ2, φ3 will be described with reference to FIG. 4. FIG. 4 schematically shows a first stepped anisotropic crystal 471, a second stepped anisotropic crystal 472, and a driving device 475 for applying varying voltages U(x) and U(y) to the anisotropic crystals 471 and 472, respectively.

This embodiment employs the physical effect of modulating an optical path length by the electro-optic effect in staircase-shaped media. Basically, when a light wave travels through a medium with higher refractive index, its phase will be delayed. Furthermore, traveling through media with the same refractive index but different thicknesses will lead to different extents of phase delay.

The components 471 and 472 consist of an optically anisotropic material and are, in each case, manufactured to a staircase shape.

The difference between the two staircase-shaped crystals, i.e. the components 471 and 472, is their direction of stepping up. The component 471 is engraved to have level-up in x direction, i.e. the thickness of the component 471 increases in the negative x-direction. The component 472 is engraved to have level-up in y direction, i.e. the thickness of the component 472 increases in the negative y-direction.

Guiding an apodized plane wave through either of components 471 and 472 will result in a step-phase wavefront because different parts of the input wavefront will experience a different thickness of the component 471 or 472, respectively.

Since the components 471 and 472 are made from an optically anisotropic medium, the refractive index of the staircase-shaped medium can be manipulated by applying an electric field, i.e. a voltage U(x) or U(y), respectively, across the components 471 and 472. Thus, the phase delay after passing through the medium can be changed accordingly.

Media such as KTN crystal (KTa1-xNbxO3) show a strong electro-optic effect (namely, Kerr effect). Applying strong electric field across it can change its refractive index. So, a staircase shape medium with efficient electro-optic effect can be used in a step-phase scanner.

Due to the described effects variable stepped phase shifts φ1, φ2, φ3 will be imposed upon a beam passing through components 471 and 472. Then, a step-phase wavefront is generated either on top of the scattering-corrected wavefront or before the scattering-correction occurs in the basic wavefront modulator 40 which is not shown in FIG. 4. Applying of varying voltages U(x), U(y), i.e. electric fields, on the components 471 and 472 can change the step size in two different directions, thereby enabling a two-dimensional manipulation of the focus in a focal plane.

Figure 5:
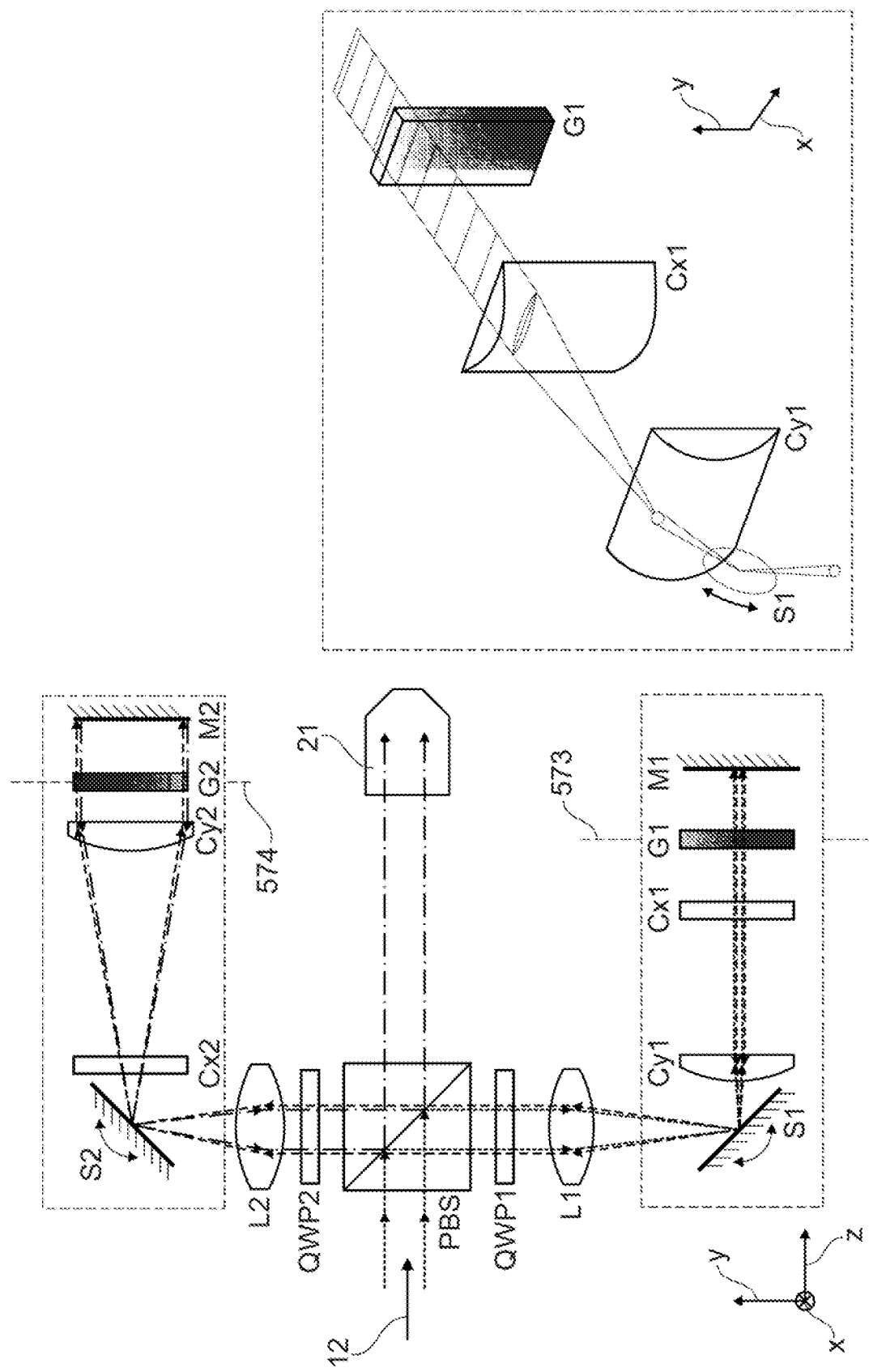
FIG. 5 illustrates schematically a further embodiment of a device for imposing variable stepped phase shifts for an apparatus according to the invention.

A further embodiment will be described with reference to FIG. 5 where the excitation light 12 to be manipulated enters the setup from the left. The excitation light 12 in this embodiment needs to be polarized. First, the excitation light 12 hits a polarizing beam splitter PBS and is reflected there in the direction of a first quarter waveplate QWP1 and a first lens L1. The first lens L1 then focuses the excitation light 12 on a first scanner S1 from which the excitation light 12 is reflected to a first cylindrical lens Cy1 with a curvature in the y-direction of the beam. A coordinate system indicating the directions is also shown in FIG. 5. The cylindrical lens Cy1 collimates the beam in the y-direction but has no influence on the beam divergence in the x-direction. Thus, a beam which is flat in the y-direction and increasingly extended, i.e. divergent, in the x-direction reaches the second cylindrical lens Cx1. The second cylindrical lens Cx1 has a curvature in the x-direction and collimates the beam in the x-direction. This leads, as can again be inferred from the perspective view in the right portion of FIG. 5, to a light sheet impinging on a first GRIN-stack G1. The GRIN-stack G1, which can be arranged in or near a plane 573 which is optically conjugate to the plane where the wavefront modulator 40 is arranged, is a stack of gradient-refractive-index glasses with different gradients.

The GRIN-stack G1 has a refractive-index gradient in a longitudinal (y) direction and a stepped refractive-index in the perpendicular (x) direction. As a consequence of the different longitudinal gradients in different tracks the size of refractive-index step varies in different transverse planes, i.e. in planes perpendicular to the y-direction but at different y-positions.

The y-position at which the light sheet hits the GRIN-stack G1 is determined by the tilt angle of the scanner S1, as can be understood from the perspective view in the right portion of FIG. 5.

The light sheet then transversely passes the GRIN-stack G1 and is subsequently reflected by a first mirror M1 back through the GRIN-stack G1. The excitation light 12 then travels back via the first and second cylindrical lenses Cx1, Cy1, the first scanner S1 and the first quarter waveplate QWP1 to the polarizing beam splitter PBS. At the polarizing beam splitter PBS, the illumination light on which stepped phase shifts are already imposed in the x-direction will be transmitted and will enter the upper branch of the setup of FIG. 5.

The upper branch comprises a second quarter waveplate QWP2, a second lens L2, a second scanner S2, a third cylindrical lens Cx2 with a curvature in the x-direction of the beam, a fourth cylindrical lens Cy2 with a curvature in the y-direction, a second GRIN-stack G2 and a second mirror M2.

The second GRIN-stack G2, which can be arranged in or near a plane 574 which is optically conjugate to the plane where the wavefront modulator 40 is arranged, can, in principle, have the same design as the first GRIN-stack G1.

In principle, the upper branch of the setup shown in FIG. 5 works like the described lower branch. There are a couple of differences, though. A first difference is that, since in the upper portion, stepped phase shifts are to be imposed in the y-direction rather than the x-direction, the order of the curvatures of the cylindrical lenses Cx2 and Cy2 is reversed as compared to Cy1 and Cx1.

Corresponding therewith, the tilt direction of the scanner S2 is different from scanner S1. Scanner S1, as described, moves the light sheet (which extends in a plane which is perpendicular to the y-direction and, thus, perpendicular to the plane of the drawing) in the y-direction, i.e. in the view on the left side of FIG. 5 in a direction perpendicular to the plane of the drawing. Scanner S2 moves the light sheet which is produced by the third and fourth cylindrical lenses Cx2 and Cy2 and which extends in a plane parallel to the plane of the drawing in the x-direction.

Finally, the light traveling back from mirror M2 and through second GRIN-stack G2, via the fourth cylindrical lens Cy2, the third cylindrical lens Cy1, the second scanner S2, the second lens L2, and the second quarter waveplate QWP2 impinges once again on the polarizing beam splitter PBS. At this time the illumination light 12 on which stepped phase shifts are now imposed both in the x-direction and the y-direction will be reflected at the polarizing beam splitter PBS in the direction of the microscope objective 21.

On a side note it has to be mentioned that due to the design of the beam path with the reflecting mirrors M1 and M2, the phase shifts are imposed, in each case, twice by GRIN-stacks G1 and G2, respectively.

Figure 6:
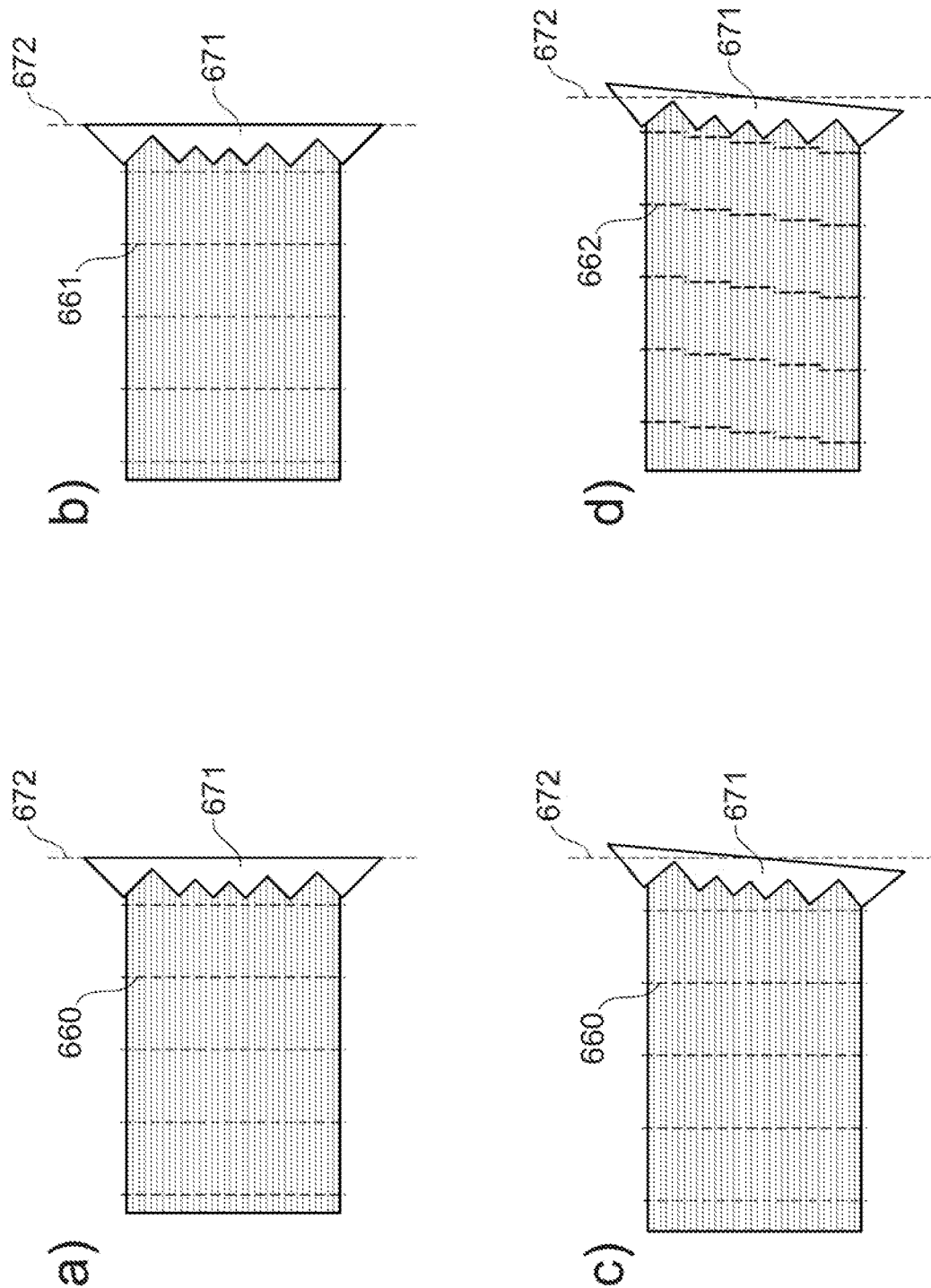
FIG. 6 illustrates schematically a principle of a further embodiment of a device for imposing variable stepped phase shifts for an apparatus according to the invention.

A further embodiment of the invention will be described with reference to FIG. 6. FIG. 6 schematically shows the operation of an array of corner mirrors 671 which can be arranged in or near a plane 672 which is optically conjugate to the plane where the wavefront modulator 40 is arranged. In principle, such an array of corner mirrors can reflect a beam into a direction exactly opposite the direction of incidence irrespective of a tilting angle of the mirror.

The array of corner mirrors 671 schematically shown in FIG. 6 has a set of slanted mirrors and can reflect a collimated beam, i.e. in particular an apodized plane wave, opposite to the direction of incidence. Different corner mirrors will shift the phase of a wavefront segment according to their relative positions.

FIG. 6a shows the wavefronts 660 of a shaped wave impinging on the array 671 which, in this situation, is not tilted with regard to the plane 672. FIG. 6b shows the reflected wavefronts 661 which are uninfluenced by the array 671.

In contrast thereto, FIG. 6c shows again the wavefronts 660 of the shaped wave impinging on the array 671 which is now tilted with regard to the plane 672. The differences in the individual optical paths imposed by the tilted array 671 brings about the stepped phase shifts as schematically shown with the reflected wavefronts 662 in FIG. 6d.

The step sizes of the stepped wavefront 662 can be adjusted by the tilting angle of the corner mirror.

In principle, the flat mirror of a galvanometric scanner can be replaced by corner mirrors and tilting them can generate step-phase wavefront with different step sizes as described.

To achieve a two-dimensional modulation of a stepped wavefront, two pieces of the corner-mirror scanner which are tilted in different directions are required and will be located in the position the same as the galvanometric mirrors, i.e. preferably in a pupil plane, in a conventional laser scanning microscope.

On a side note it has to be mentioned that the methods making use of staircase-shaped electro-optic media (FIG. 4), media GRIN-stacks (FIG. 5), and corner mirrors (FIG. 6) can only be used when the division of correcting sectors on the wavefront modulator can be decomposed into two independent components in ordinary cartesian coordinates, namely, the x- and y-axis.

Figure 7:
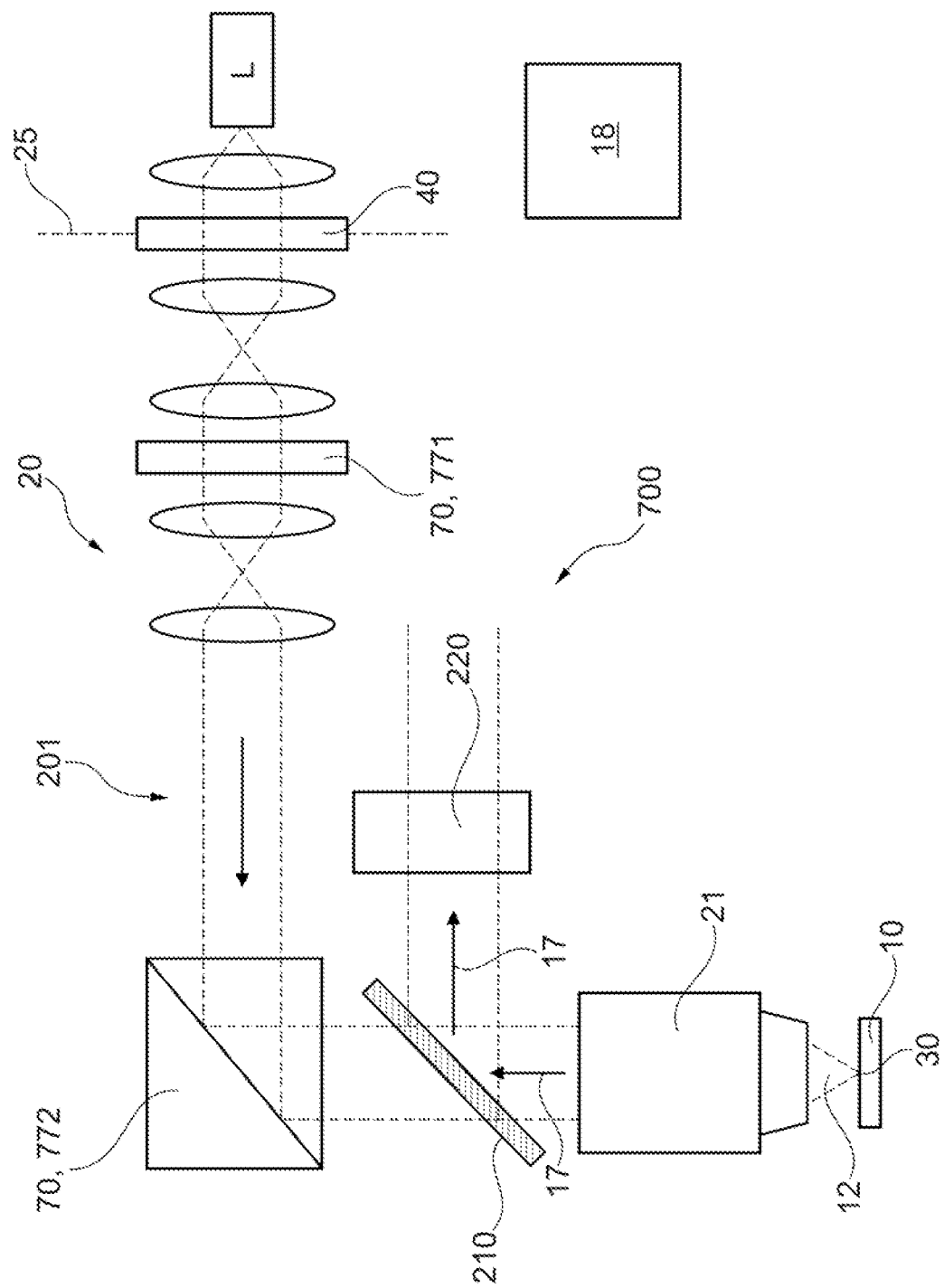
FIG. 7 illustrates schematically an embodiment of a microscope according to the invention.

A further embodiment will be described with reference to FIG. 7. FIG. 7 shows an apparatus 201 for manipulating a focus 30 of excitation light 12 on or in a sample 10 in a microscope 700. The microscope 700 can preferably be a 2-photon-fluorescence microscope.

The apparatus 201 comprises as essential components a light source L, typically a laser, for emitting excitation light 12 and an excitation beam path 20 for guiding the excitation light 12 onto or into the sample 10.

The excitation beam path 20 comprises a microscope objective 21 for guiding and focusing the excitation light 12 onto or into the sample 10 and a wavefront modulator 40 for modulating the excitation light 12 which can be arranged close to a pupil plane 25, i.e. in a plane which is optically conjugate to a back focal plane (not shown) of the microscope objective 21.

A control device 50 is present which, according to the invention, is designed for driving the wavefront modulator 40 to generate a predefined number of shaped waves (not shown in FIG. 7) on or in the sample 10, each of the shaped waves being characterized by a specific angle in relation to an optical axis. As described above, the focus 30 is generated at a specified location on or in the sample 10 by superposition of the shaped waves.

According to the invention, for manipulating the location of the focus 30 on or in the sample 10, a device 70 for imposing variably stepped phase shifts upon the shaped waves is present, where the phase shifts imposed in each case on the shaped waves change stepwise between different shaped waves.

In the embodiment shown in FIG. 7, the device 70 is realized by a digital-mirror-device 771 (or a comparable device) which can be arranged in a plane which is optically conjugate to the plane where the wavefront modulator 40 is arranged and downstream of the wavefront modulator 40 and an x-y-scanner 772 which is arranged in a further plane further downstream of the digital-mirror-device 771 which is also optically conjugate to the plane where the wavefront modulator 40 is arranged.

The scanner 772 reflects the excitation light 12 in the direction of the microscope objective 21. The microscope objective 21 guides and focuses the radiation into the sample 10. Detection light 17, i.e. radiation emitted by the sample 10 upon irradiation with the excitation light 12 travels back through the microscope objective 21. For coupling-out the detection light 17, which can in particular be 2-photon-fluorescence light, a main beam splitter 210 can be present. For detecting the detection light, a detector 220 is present which, in the example shown, is arranged in a non-descanned portion of the beam path.

The microscope 700 according to the invention comprises a control unit 18 for controlling the apparatus 201 for focusing excitation light 12 and the detector 22 and for evaluating the detection data received from the detector 220. The control unit 18 can be a PC.

The device 70 for imposing variably stepped phase shifts upon the shaped waves of FIG. 7 works as follows: The digital-mirror-device 771 imposes different tilts to the wavefront received from the wavefront modulator 40. These tilts are located around the spots in a plane which is optically conjugate to the plane where the wavefront modulator 40 is arranged. To achieve the stepped phase shifts necessary for the realization of the invention, the segments of the digital-mirror-device are now operated in coordination with the x-y scanner such that phase ramps are, in each case, canceled out.

Therefore, the amount of tilt of each of the segments of the digital-mirror-device needs to be the same as that of the x-y-scanner but has the opposite sign or direction. Therefore, locally all tilts in the wavefront are compensated but the overall tilt remains and is realized in steps. Depending on the flexibility of the digital-mirror-device 771 and the number of variable regions, this set-up can realize the step-scanning for different realizations of sparsely lit illumination pupils. The digital-mirror-device or a similar adaptive element, particularly together with a pupil relay, could be an add-on for presently commercially available laser-scanning-microscopes.

A further embodiment of an apparatus 202 for manipulating a focus 30 of excitation light 12 on or in a sample 10 in a microscope 800 will be described with reference to FIG. 8. Only the differences as compared to the embodiment shown in FIG. 7 will be explained.

Figure 8:
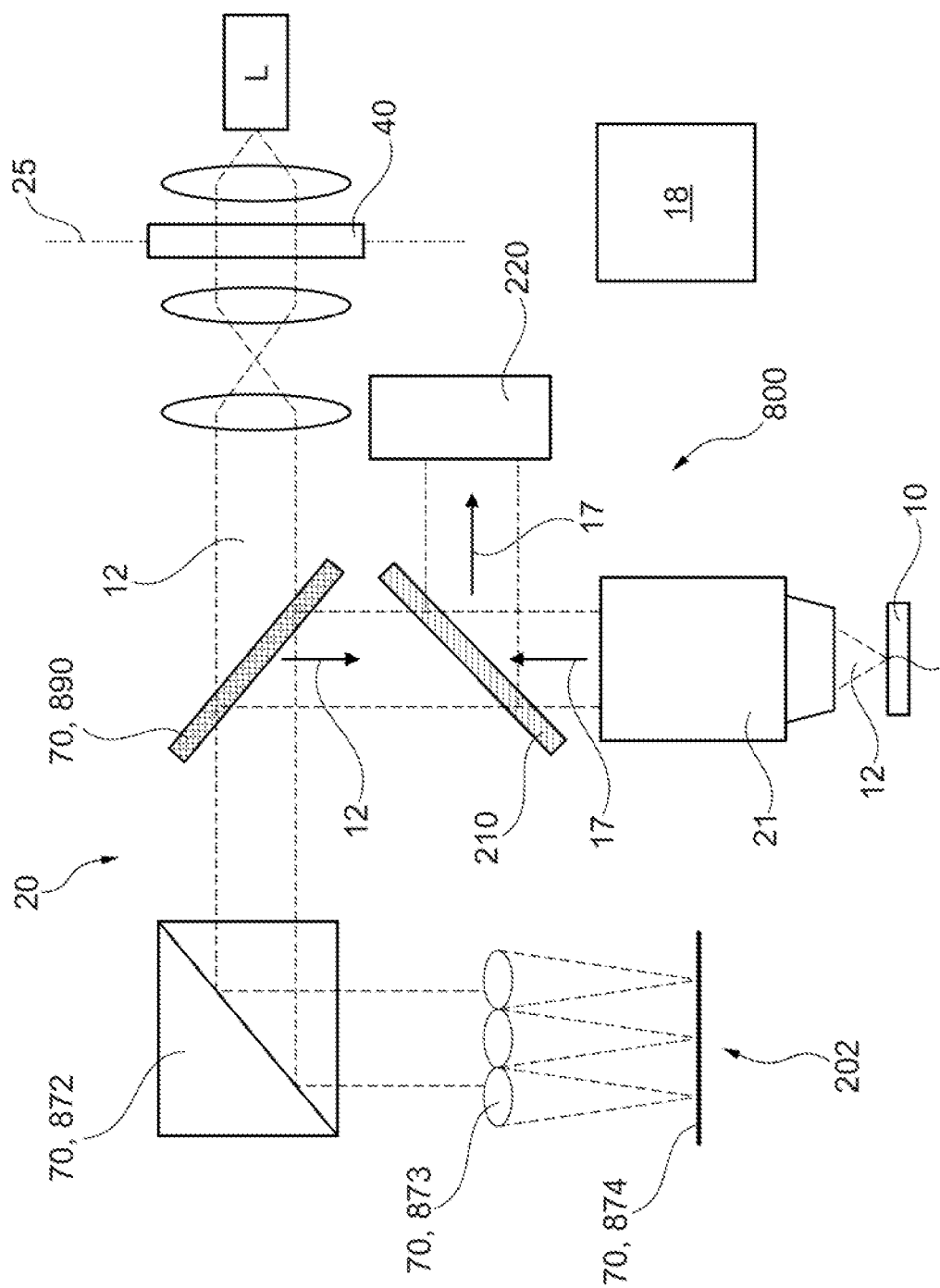
FIG. 8 illustrates schematically a further embodiment of a microscope according to the invention.

The device 70 for imposing variably stepped phase shifts upon the shaped waves in the embodiment of FIG. 8 comprises an x-y-scanner 872, a lenslet array 873, a fixed mirror 874, and a beam splitter 890.

In the embodiment of FIG. 8, the device 70 works as follows: The excitation light 12 modulated by the wavefront modulator 40 passes through the beam splitter 890 and impinges on the x-y-scanner 872 which directs the excitation light 12 in the direction of the lenslet array 873. With the reflection at the x-y-scanner 872, the excitation light 12 acquires a linear phase ramp depending on the tilt angle of the x-y-scanner 872. Individual portions of the tilted wavefronts now pass through different lenses of the lenslet array 873. The x-y-scanner 872 and the mirror 874 are, on opposite sides, arranged at a distance of one focal length of the lenslet array 873 from the latter. Therefore, the excitation light 12 is focused by individual lenses of the lenslet array 873 on the mirror 874. The effective beam path from the x-y-scanner 872, through the lenslet array 873 to the mirror 874 and back once again through the lenslet array 873 causes the individual portions of the wavefront to be rotated laterally, whereby the tilt of the wavefront is reversed. The global phase acquired on the x-y-scanner 872, however, is unchanged. Therefore, the second reflection at the scanner 872 reverses the rotated tilt of the wavefront but doubles the global phase and, thus, leads to the desired stepped pattern. The beam splitter 890 can, e.g., be a polarizing beam splitter. In a variant, the mirror 874 can be slightly tilted and then beam splitting can be achieved by total reflection at the beam splitter 890.

Generally, the configuration shown in FIG. 8 will only work if the tilt angle of the x-y-scanner 872 is comparatively small. Otherwise one will likely encounter crosstalk between individual channels defined by the lenses of the lenslet array 873. This problem can be solved if, instead of with the shaped waves as such, the x-y-scanner 872 is illuminated by an array of spots, i.e. a partially masked shaped wave.

Figure 9:
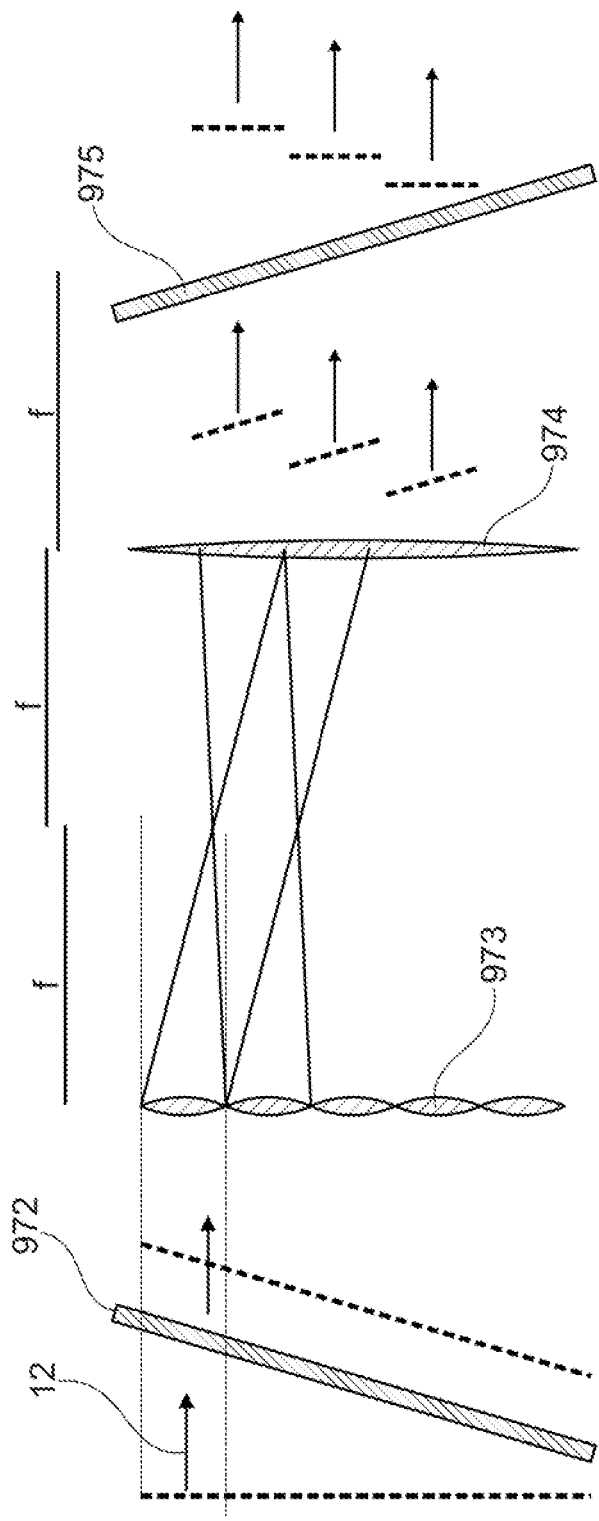
FIG. 9 illustrates schematically a variant of the embodiment of FIG. 8.

A variant of the embodiment shown in FIG. 8 will be described with respect to the schematic FIG. 9. The basic idea of this embodiment is to avoid crosstalk problems by passing through a lenslet array 973 only once, i.e. by omitting the mirror 874. In the embodiment of FIG. 9, a wavefront of excitation light 12 impinges on a first x-y-scanner 972 and, upon reflection, acquires a linear phase ramp depending on the tilt angle of the x-y-scanner 972. As in FIG. 8, the individual portions of the tilted wavefront of the excitation light 12 are focused by the lenses of a lenslet array 973. In contrast to the situation in FIG. 8, in FIG. 9 a lenslet array 974 is arranged in a distance of two focal lengths f from the lenslet array 973. The lenslet array 974 collimates the incident portions of the wavefront in the direction of a further x-y-scanner 975, as shown schematically in FIG. 9. Note that, in FIG. 9 lenslet array 974 is incorrectly drawn as single lens. The component 974 needs to be a lenslet array. These portions of the now collimated beam still have the tilted wavefronts but have, as can also be seen from FIG. 9, stepped phase shifts. To achieve perpendicular wavefronts, the second x-y-scanner is operated such that the phase ramps imposed by the first x-y-scanner 972 are canceled out, thus finally receiving the stepped phase shifts necessary for the realization of the invention.

The approach of FIG. 9 can be viewed as a sequential setup of the solution of FIG. 8. Geometries using the same mirror for scanning as well as descanning may be preferential, as they require less effort for synchronization.

As both approaches use conventional scanners, they can be run at the same speed as conventional scanning systems.

A further embodiment of an apparatus 40 for manipulating a focus 30 of excitation light 12 on or in a sample 10 in a microscope 1000 will now be described with reference to FIG. 10. Again, only the differences as compared to the embodiment shown in FIG. 7 will be explained.

Figure 10:
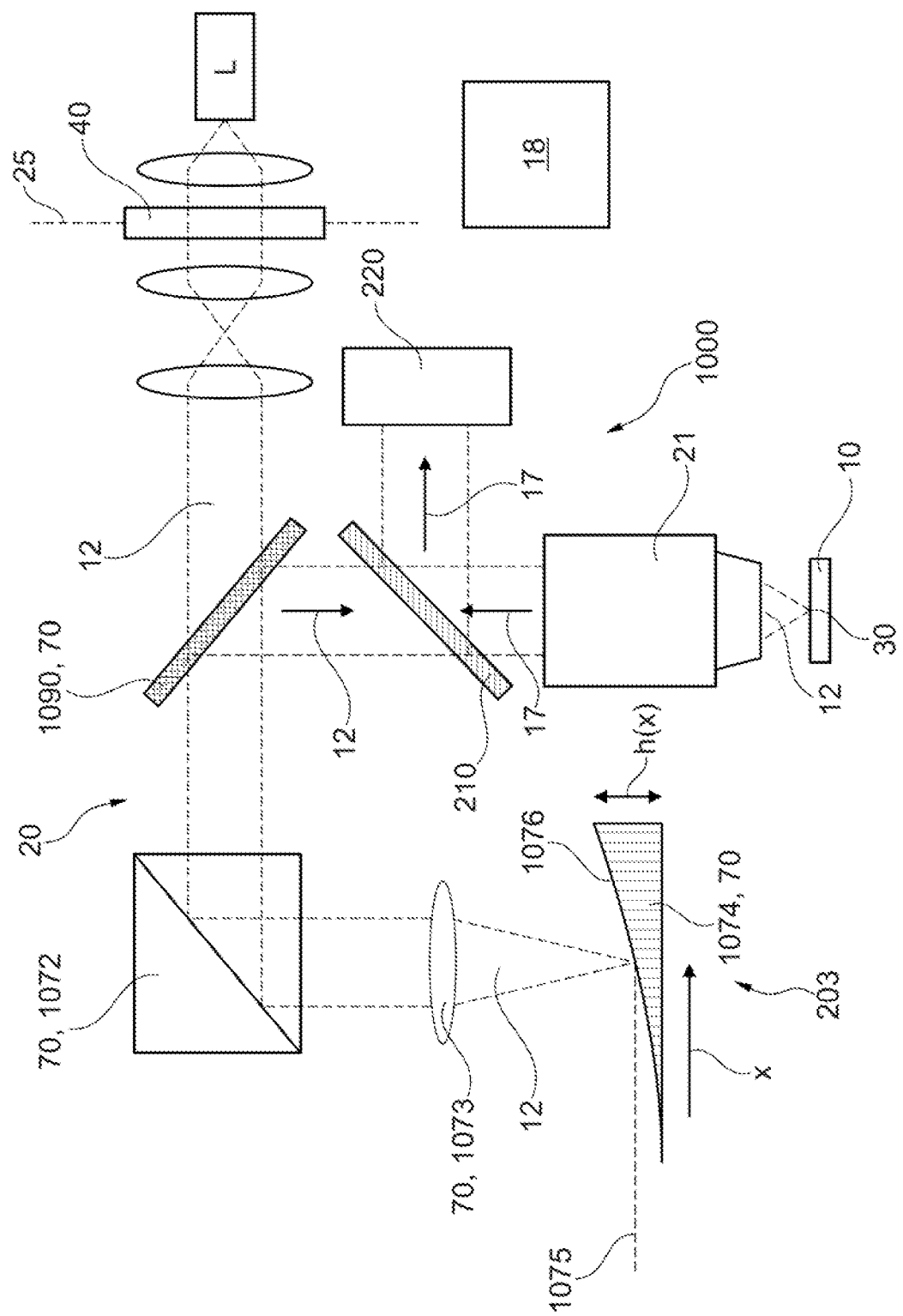
FIG. 10 illustrates schematically a further embodiment of a microscope according to the invention.

The device 70 for imposing variably stepped phase shifts upon the shaped waves in the embodiment of FIG. 10 comprises an x-y-scanner 1072, a lens 1073, a staircase-shaped mirror 1076, and a beam splitter 1090.

The staircase-shaped mirror 1076 which is arranged in a plane 1075 which is optically conjugate to the plane where the wavefront modulator 40 is arranged and has a plurality of stairs 1076 with, in each case, an individual height h(x). The height h(x), as shown in FIG. 10, increases comparatively slowly in the x-direction. By means of the x-y- scanner, the wavefronts of the excitation light 12 which are already corrected by the wavefront modulator 40 can be directed to different sections of the staircase-shaped mirror 1076.

Depending now on where the excitation light 12 is incident on the staircase, phase shifts with varying magnitudes of the steps will be imposed on the wavefront of the incident beam. The portions of the excitation light 12 on which, in each case, different phase shifts are imposed travel back through the lens 1073 and are reflected once again by the x-y-scanner 1072 in the direction of the beam splitter 1090. At this instance, the excitation light 12 is at least partially reflected at the beam splitter 1090 in the direction of the microscope objective 21. The generation of the focus 30 works as described above. The phase shifts imposed on the different portions of the excitation light 12 can be manipulated by manipulating the section of the staircase-shaped mirror 1076 onto which the excitation light 12 is guided by the x-y-scanner 1072.

In the situation shown in FIG. 10, the x-y-scanner will have to manipulate the beam only in the x-direction. To achieve a manipulation of the focus 13 also in the y-direction, a setup as shown in FIG. 5 with an additional splitter, e.g. a polarizing beam splitter, would be necessary. As in FIG. 5, the manipulation in the x-direction would take place in one branch and the manipulation in the y-direction and the other branch.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMBERS

10 sample
12 excitation light
13 location of focus
14 location of focus
15 location of focus
17 detection light
18 control unit
20 excitation beam path
21 objective, in particular microscope objective
22 lens
23 back focal plane
24 intermediate image plane
25 pupil plane
26 tube lens
28 optical axis
30 focus
31 location of focus 30 in sample 10 and on optical axis 28
32 location of focus 30 in sample 10 and at distance from optical axis 28
40 wavefront modulator
50 control device
61 shaped wave
62 shaped wave
63 shaped wave
64 center of intensity distribution of shaped wave 61 in pupil plane 25
65 center of intensity distribution of shaped wave 62 in pupil plane 25
66 center of intensity distribution of shaped wave 63 in pupil plane 25
67 region around center 64
68 region around center 65
69 region around center 66
70 device for imposing variably stepped phase shifts $\varphi 1$, $\varphi 2$, $\varphi 3$ upon shaped waves 61, 62, 63
201 apparatus for manipulating a focus of excitation light on or in a sample
202 apparatus for manipulating a focus of excitation light on or in a sample
203 apparatus for manipulating a focus of excitation light on or in a sample
204 apparatus for manipulating a focus of excitation light on or in a sample
205 apparatus for manipulating a focus of excitation light on or in a sample
210 main beam splitter
220 detector
471 first stepped anisotropic crystal
472 second stepped anisotropic crystal
475 driving device for applying varying voltages to anisotropic crystal 471
573 plane optically conjugate to plane of wavefront modulator 40
574 plane optically conjugate to plane of wavefront modulator 40
660 wavefront of incident shaped wave
661 wavefront of reflected shaped wave
662 stepped wavefront of reflected shaped wave
671 array of corner mirrors with one-dimensional structure
672 plane optically conjugate to plane of wavefront modulator 40
700 microscope
771 digital-mirror-device
772 x-y-scanner
800 microscope
872 x-y-scanner
873 lenslet array
874 fixed mirror
890 beam splitter
972 first x-y-scanner
973 lenslet array
974 lenslet array
975 second x-y-scanner
1000 microscope
1072 x-y-scanner
1073 lens
1074 staircase-shaped mirror
1075 plane optically conjugate to plane of wavefront modulator 40
1076 stairs of mirror 1074
1090 beam splitter
1202 telescope lenses
1204 telescope lenses
1206 lenslet array
1207 plane of lenslet array 1206, in particular optically conjugate to
1209 and/or 1211
1208 individual lenslet of lenslet array 1206

1209 plane of wavefront modulator 40, in particular optically conjugate to 1207 and/or 1211
1210 focal plane of lenslet array 1206
1211 plane of device for imposing variably stepped phase shifts 70, in particular optically conjugated to 1207 and/or 1209
Cx1 second cylindrical lens with curvature in x direction of beam
Cx2 third cylindrical lens with curvature in x direction of beam
Cy1 first cylindrical lens with curvature in y direction of beam
Cy2 forth cylindrical lens with curvature in y direction of beam
d spacing of centers 64, 65, 66 in plane 25
f1 focal length of lenslets of lenslet array 1206
f2 hack focal length of objective 21
f3 focal length of lenslets emulated by wavefront modulator 40
G1 GRIN stack
G2 GRIN stack
h(x) heights of stairs 1076
L light source, laser
L1 lens
L2 lens
M1 mirror
M2 mirror
PBS polarization beam splitter
QWP1 quarter waveplate
QWP2 quarter waveplate
S1 scanning mirror
S2 scanning mirror
U(x) varying voltage to be applied to anisotropic crystal 471
U(y) varying voltage to be applied to anisotropic crystal 472
x first direction perpendicular to direction z optical axis
y second direction perpendicular to direction z of optical axis and perpendicular to first direction x
$\varphi 1$ phase shift imposed on shaped wave 61
$\varphi 2$ phase shift imposed on shaped wave 62
$\varphi 3$ phase shift imposed on shaped wave 63

What is claimed is:

1. Apparatus for manipulating a focus of excitation light on or in a sample, particularly in a microscope, comprising a light source for emitting excitation light,
an excitation beam path for guiding the excitation light onto or into the sample, the excitation beam path comprising an objective for guiding the excitation light onto or into the sample and a wavefront modulator for modulating the excitation light,
and a control device for driving the wavefront modulator, wherein
the control device is designed for driving the wavefront modulator to generate a number of shaped waves on or in the sample,
that a focus is generated at a specified location on or in the sample by superposition of the shaped waves and
that, for manipulating the location of the focus on or in the sample, a device for imposing variably stepped phase shifts upon the shaped waves is present, where the phase shifts imposed in each case on the shaped waves change stepwise between different shaped waves.

2. The apparatus according to claim 1, wherein
the device for imposing variably stepped phase shifts upon the shaped waves or at least a component of this device is arranged in a plane which is optically conjugate to a plane where the wavefront modulator is arranged.

3. The apparatus according to claim 1, wherein
a lenslet array is present which is in particular arranged in a plane that is optically con-jugate to a plane where the wavefront modulator is arranged and/or to a plane where the device for imposing variably stepped phase shifts or at least a component of this device is arranged.

4. The apparatus according to claim 1, wherein
the device for imposing variable stepped phase shifts comprises at least one separate wavefront modulator which is, in particular, arranged in or near a plane which is opti-cally conjugate to a plane where the wavefront modulator is arranged.

5. The apparatus according to claim 1, wherein the device for imposing variable stepped phase shifts comprises
at least one electro-optic component, in particular at least one anisotropic crystal, with a stepped thickness, arranged in particular in or near a plane which is optically conjugate to a plane where the wavefront modulator is arranged, and
a driving device for applying varying voltages to the at least one electro-optic compo-nent to bring about varying magnitudes of the steps of the imposed phase shifts.

6. The apparatus according to claim 1, wherein the device for imposing variable stepped phase shifts comprises
at least one stacked gradient refractive-index glass component, arranged in particular in or near a plane which is optically conjugate to a plane where the wavefront modula-tor is arranged, and
at least one x-y-scanner,
wherein, for imposing variably stepped phase shifts upon the shaped waves, the x-y-scanner guides the excitation light onto different sections of the at least one stacked gradient refractive-index glass component.

7. The apparatus according to claim 6, wherein optical means, comprising in particular at least one cylindrical lens, are present for form-ing a light sheet of excitation light and for guiding the light sheet onto different sections of a stacked gradient refractive-index glass component.

8. The apparatus according to claim 1, wherein the device for imposing variable stepped phase shifts comprises at least one array of corner mirrors with a one-dimensional structure, arranged in particular in or near a plane plane which is optically conjugate to a plane where the wavefront modulator is ar-ranged.

9. The apparatus according to claim 1, wherein the device for imposing variable stepped phase shifts comprises an x-y-scanner, ar-ranged in particular in or near a plane which is optically conjugate to a plane where the wavefront modulator is arranged, and a digital-mirror-device, positioned in particu-lar in or near a plane which is optically conjugate to the plane where the wavefront modulator is arranged.

10. The apparatus according to claim 1, wherein the device for imposing variable stepped phase shifts comprises an x-y-scanner, ar-ranged in particular in or near a plane which is optically conjugate to a plane where the wavefront modulator is arranged, a lenslet array, and a fixed mirror, wherein the excitation light is guided from the x-y-scanner via the lenslet array to the fixed mirror, is then reflected by the fixed mirror back through the lenslet array and is then guided via the x-y-scanner in the direction of the objective.

11. The apparatus according to claim 1, wherein the device for imposing variable stepped phase shifts comprises
a first x-y-scanner, arranged in particular in or near a plane which is optically conjugate to a plane where the wavefront modulator is arranged,
a lenslet array and a lens arranged downstream of the first x-y-scanner and a second x-y-scanner, arranged in particular in or near a plane which is optically conjugate to the plane where the wavefront modulator is arranged, downstream of the lenslet array and the lens.

12. The apparatus according to claim 1, wherein the device for imposing variable stepped phase shifts comprises
an x-y-scanner, arranged in particular in or near a plane which is optically conjugate to a plane where the wavefront modulator is arranged,
a spatial filter with a plurality of apertures downstream of the x-y-scanner and a lenslet array downstream of the spatial filter.

13. The apparatus according to claim 12, wherein the device for imposing variable stepped phase shifts comprises additionally a lenslet-device between the x-y-scanner for focusing excitation light into apertures of the spatial filter.

14. The apparatus according to claim 1, wherein the device for imposing variable stepped phase shifts comprises at least
one staircase-shaped mirror, arranged in particular in or near a plane which is optically conjugate to a plane where the wavefront modulator is arranged, where the heights of the stairs increase in one direction,
and an x-y-scanner, wherein, for imposing variably stepped phase shifts upon the shaped waves, the x-y-scanner guides the excitation light onto different sections of the staircase-shaped mirror.

15. The apparatus according to claim 14, further comprising
optical means, comprising at least one cylindrical lens for forming a light sheet of excitation light and for guiding the light sheet onto different sections of the staircase-shaped mirror.

16. Method for manipulating a focus of excitation light on or in a sample, particularly in a microscope, comprising the steps of
guiding the excitation light on an excitation beam path to an objective,
guiding, by means of the objective, the excitation light onto or into the sample, manipulating, by means of a wavefront modulator in the excitation beam path, the excitation light,
wherein the wavefront modulator is driven to generate a number of shaped waves on or in the sample,
that stepped phase shifts are imposed upon the shaped waves, the phase shifts changing stepwise between different shaped waves, and
that, for manipulating the location of the focus on or in the sample, a magnitude of the steps of the phase shifts between different shaped waves is varied.

17. The method according to claim 16, wherein
each of the shaped waves is corrected for influences of the sample such that the shaped waves resemble, in each case, planar wavefronts in a focal plane on or in the sample.

18. The method according to claim 16, wherein
that the location of the focus is manipulated in three dimensions.

19. The method according to claim 16, wherein
for manipulating the location of the focus on or in the sample, only the magnitude of the steps of the phase shifts between different shaped waves is varied.

20. The method according to claim 16, wherein
the wavefront modulator is driven such that the shaped waves are additionally subjected to phase shifts which emulate an effect of a lenslet array.

21. The method according to claim 16, wherein stepped phase shifts are variably imposed on the shaped waves with the same wavefront modulator that generates the shaped waves.

22. The method according to claim 16, wherein
a separate wavefront modulator, that compared with the wavefront modulator generating the shaped waves, is faster and can be operated in a lower resolution, is used to bring about varying magnitudes of the steps of the imposed phase shifts.

23. The method according to claim 16, wherein
the centers (64, 65, 66) of the intensity distributions corresponding to each of the shaped waves (61, 62, 63) in the plane of the wavefront modulator (40) are localized on a non-uniform grid.

24. The method according to claim 16, wherein
the magnitude of the imposed phase shift ($\varphi 1$, $\varphi 2$, $\varphi 3$) on each of the shaped waves (61, 62, 63) is a linear function of the position of the center (64, 65, 66) of the intensity distribution of the respective shaped waves (61, 62, 63) in the plane of the a wavefront modulator (40).

25. The method according to claim 16, wherein
at least some of the shaped waves resemble apodized plane waves in a focal plane on or in the sample.

26. Microscope, comprising the apparatus for focusing excitation light onto or into a sample according to claim 1, where the objective is a microscope objective,
a detection beam path for guiding detection light, in the direction of a detector,
the detector for detecting the detection light, and
a control unit for controlling the apparatus for focusing excitation light and the detector and for evaluating detection data received from the detector.

* * * * *